United States Patent
Rowe et al.

(10) Patent No.: US 11,030,453 B2
(45) Date of Patent: Jun. 8, 2021

(54) OPTICAL AUTHENTICATION OF OBJECTS BASED ON LATENT STRUCTURAL CHARACTERISTICS

(71) Applicant: ASSA ABLOY AB, Stockholm (SE)

(72) Inventors: Robert K. Rowe, Corrales, NM (US); Mark Robinton, Eden Prairie, MN (US); Ting Sun, Cupertino, CA (US)

(73) Assignee: ASSA ABLOY AB, Stockholm (SE)

( * ) Notice: Subject to any disclaimer, the term of this patent is extended or adjusted under 35 U.S.C. 154(b) by 0 days.

(21) Appl. No.: 16/061,212

(22) PCT Filed: Dec. 16, 2015

(86) PCT No.: PCT/US2015/066215
§ 371 (c)(1),
(2) Date: Jun. 11, 2018

(87) PCT Pub. No.: WO2017/105450
PCT Pub. Date: Jun. 22, 2017

(65) Prior Publication Data
US 2019/0286902 A1  Sep. 19, 2019

(51) Int. Cl.
*G06K 9/00* (2006.01)
*G06K 9/46* (2006.01)
(Continued)

(52) U.S. Cl.
CPC ....... *G06K 9/00577* (2013.01); *G06K 9/4647* (2013.01); *G06K 9/522* (2013.01);
(Continued)

(58) Field of Classification Search
None
See application file for complete search history.

(56) References Cited

U.S. PATENT DOCUMENTS

| 5,208,630 A | 5/1993 | Goodbrand et al. |
| 8,712,163 B1 | 4/2014 | Osheroff |
| 8,923,626 B1 | 12/2014 | Stewenius |
| 9,082,062 B2 | 7/2015 | Sharma et al. |

(Continued)

FOREIGN PATENT DOCUMENTS

| EP | 3375132 | 9/2018 |
| WO | 2017105450 | 6/2017 |

OTHER PUBLICATIONS

Vigneron, V., et al. "Latent variable analysis and signal separation." (2012): 1765-1766. (Year: 2012).*

(Continued)

*Primary Examiner* — Vu Le
*Assistant Examiner* — Tracy Mangialaschi
(74) *Attorney, Agent, or Firm* — Schwegman Lundberg & Woessner, P.A.

(57) ABSTRACT

Systems and methods are described for using optical techniques to authenticate a pre-characterized object according to its latent structural characteristics. For example, an image stack can be generated by aligning enrollment images acquired from an enrollment object according to different optical geometries. Enrollment basis functions can be computed from the stack that describe latent structural characteristics of the enrollment object, and enrollment magnitudes can be extracted from those basis functions. Subsequently, another image stack can be generated by aligning authentication images acquired from an authentication object according to different optical geometries. Authentication basis functions can be computed from the stack to describe latent structural characteristics of the authentication object, and authentication magnitudes can be extracted from those basis functions. A mathematical correspondence can be computed between the enrollment and authentication magnitudes, from which a determination can be made as to whether the authentication object is the enrollment object.

15 Claims, 12 Drawing Sheets

(51) Int. Cl.
*G06K 9/52* (2006.01)
*G06K 9/62* (2006.01)
*H04L 9/32* (2006.01)
*G06F 21/34* (2013.01)

(52) U.S. Cl.
CPC .......... *G06K 9/6286* (2013.01); *H04L 9/3226* (2013.01); *G06F 21/34* (2013.01); *G06K 2009/0059* (2013.01); *H04L 2209/60* (2013.01)

(56) References Cited

U.S. PATENT DOCUMENTS

| | | | |
|---|---|---|---|
| 9,152,862 | B2 | 10/2015 | Ross et al. |
| 2008/0240574 | A1 | 10/2008 | Geun et al. |
| 2012/0243797 | A1* | 9/2012 | Di Venuto Dayer ........................ G06K 9/00577 382/218 |
| 2012/0300985 | A1* | 11/2012 | Ito ................... G06K 9/00577 382/103 |
| 2014/0126813 | A1 | 5/2014 | Jia |
| 2014/0140570 | A1* | 5/2014 | Ross ................. G06K 9/00577 382/100 |
| 2015/0090777 | A1* | 4/2015 | Cho ................... G06K 7/1434 235/375 |
| 2015/0186751 | A1 | 7/2015 | Mosier |

OTHER PUBLICATIONS

Cichocki A, Mandic D, De Lathauwer L, Zhou G, Zhao Q, Caiafa C, Phan HA. Tensor decompositions for signal processing applications: From two-way to multiway component analysis. IEEE Signal Processing Magazine. Feb. 10, 2015;32(2): 145-63. (Year: 2015).*

International Search Report issued by the Korean Intellectual Property Office for International Patent Application No. PCT/US2015/066215, dated Aug. 24, 2016, 3 pages.

Written Opinion issued by the Korean Intellectual Property Office for International Patent Application No. PCT/US2015/066215, dated Aug. 24, 2016, 10 pages.

"International Application Serial No. PCT US2015 066215, International Preliminary Report on Patentability dated Jun. 28, 2018", 12 pgs.

"European Application Serial No. 15910923.0, Extended European Search Report dated Jun. 12, 2019", 12 pgs.

Vigneron, V, "Latent variable analysis and signal separation—ScienceDirect", XP55592595, https: www.sciencedirect.com science article pii S0165168412000047?via-ihub, (Aug. 31, 2012), 2 pgs.

"European Application Serial No. 15910923.0, Communication Pursuant to Article 94(3) EPC dated Jan. 27, 2020", 8 pgs.

"European Application Serial No. 15910923.0, Response filed Jun. 4, 2020 to Communication Pursuant to Article 94(3) EPC dated Jan. 27, 2020", 12 pgs.

"Brazil Application Serial No. 112018012129-0, Office Action dated Aug. 31, 2020", w/ English translation, 5 pgs.

"Brazil Application Serial No. 112018012129-0, Response filed Dec. 2, 2020 to Office Action dated Aug. 31, 2020", w/ English claims, 73 pgs.

"European Application Serial No. 15910923.0, Communication Pursuant to Article 94(3) EPC dated Oct. 6, 2020", 3 pgs.

* cited by examiner

OPTICAL AUTHENTICATION OF OBJECTS BASED ON LATENT STRUCTURAL CHARACTERISTICS

CROSS REFERENCE TO RELATED APPLICATION

This application is a national stage application under 35 U.S.C. 371 of PCT Application No. PCT/US2015/066215 having an international filing date of Dec. 16, 2015, which designated the United States, which PCT application is incorporated by reference in its entirety in the present application.

FIELD

Embodiments relate generally to authenticating objects, and, more particularly, to using optical techniques to authenticate (e.g., identify and/or confirm the identity or authenticity of) a pre-characterized object according to its latent structural characteristics.

BACKGROUND

In many contexts, it is desirable to be able to authenticate a particular object. Some illustrative authentication approaches can involve adding authentication information to a substrate, such as obtaining one or more signatures (e.g., of parties or witnesses to a document), adding one or more official seals (e.g., a seal of a certified notary, a seal or logo of a certifying agency, etc.), adding a watermark (e.g., printed on a document substrate with visible or other ink), storing information (e.g., to a magnetic stripe, an integrated chip, etc.), etc. Other illustrative authentication approaches can involve specialized substrates, such as embedded watermarks (e.g., formed into the stock on which a document is printed), special embedded materials (e.g., stock with embedded patterns, fibers, holograms, etc.), etc. These and other traditional approaches to authentication tend to be limited in a number of ways. For example, authentication approaches that rely on adding authentication information to a substrate can often be defeated through forgery, or the like (e.g., by obtaining similar or identical stock and adding forged information thereto); and authentication approaches that rely on specialized substrates tend to be expensive. These and other traditional authentication approaches can also be difficult and/or expensive to detect (e.g., often requiring specialized detection equipment), to distribute (e.g., often requiring centralizing personalization of such objects to limit the dissemination of specialized stock), etc.

BRIEF SUMMARY

Among other things, systems and methods are described herein for using optical techniques to authenticate (e.g., identify and/or confirm the identity or authenticity of) a pre-characterized object according to its latent structural characteristics. For example, some embodiments can use standard optics (e.g., those of a typical smart phone camera, or the like) to acquire enrollment images of an enrollment object with different optical geometries (e.g., from different camera and/or lighting angles). The enrollment images can be aligned to generate an image stack, from which a set of enrollment basis functions can be computed. The basis functions can include latent relationships among their elements that describe latent structural characteristics of the enrollment object, such as inherent micro-structures that form the enrollment object (e.g., structural characteristics manifest by the pulp fibers of a region of paper or card stock; by the granules and/or cells making up a region of cork, glass, etc.; by the reflections from randomly distributed particles such as metal flakes and other reflective material, etc.). For example, the basis functions can include set of pixels locations and corresponding intensities, Eigenvectors, and/or other functions that describe the latent structural characteristics of the enrollment object in a basis (e.g., in a pixel basis, an Eigen basis, etc.). A set of enrollment magnitudes can be extracted from the enrollment basis functions.

Subsequently, the same or a different camera can be used to acquire authentication images of an authentication object (e.g., purportedly the same object) with another set of optical geometries (e.g., the same as, or different from, those used for the enrollment image collection). The authentication images can be aligned to generate an image stack, from which a set of authentication basis functions can be computed to describe latent structural characteristics of the authentication object. A set of authentication magnitudes can be extracted from the authentication basis functions. A mathematical correspondence (e.g., a correlation) can be computed between the enrollment and authentication magnitudes. A determination can be made, as a function of the mathematical correspondence, as to whether the authentication object is the enrollment object. Alternatively, mathematical correspondences can be computed between the authentication magnitudes and multiple different enrollment magnitudes to identify the authentication object as one (or none) of a set of enrollment objects.

BRIEF DESCRIPTION OF THE DRAWINGS

The present disclosure is described in conjunction with the appended figures.

Figure 1:
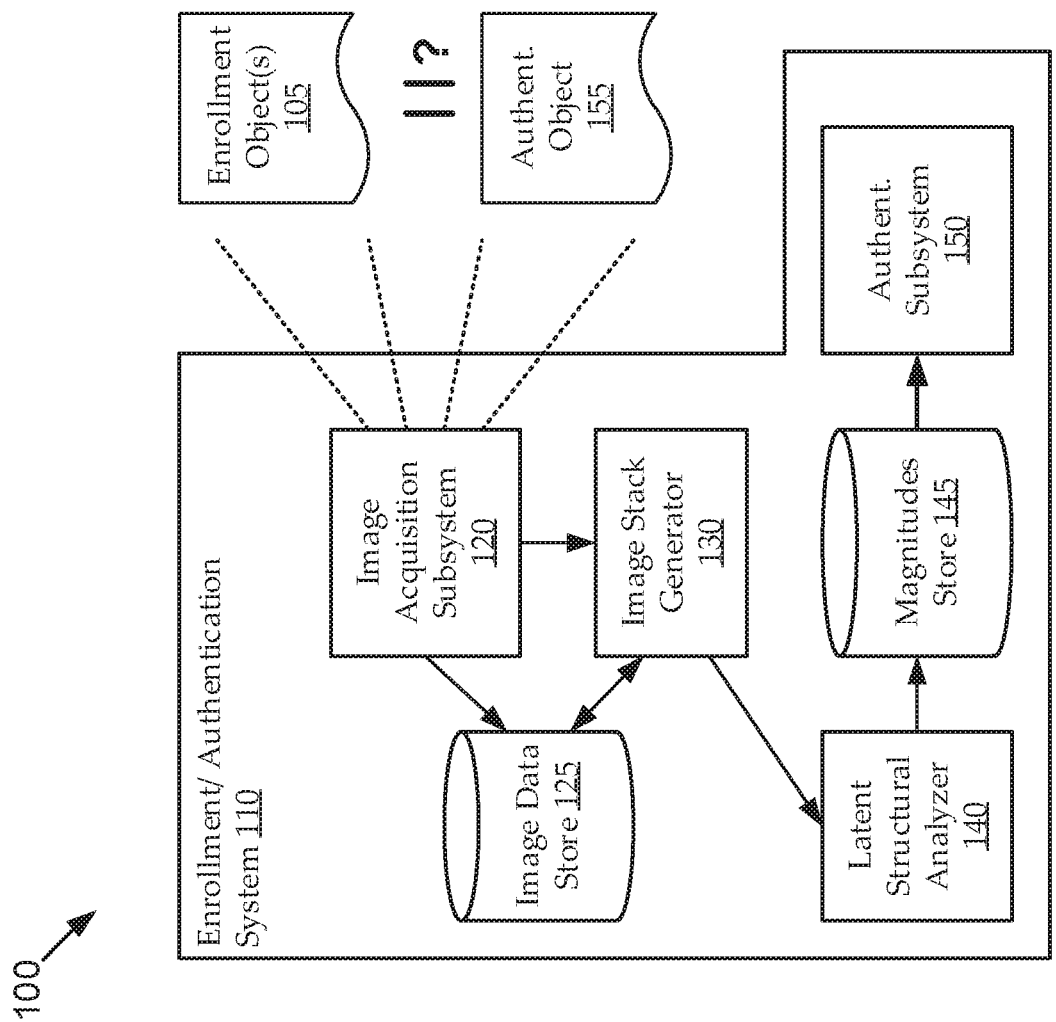
FIG. 1 shows a block diagram of an object authentication environment having an enrollment/authentication system, according to various embodiments.

In the appended figures, similar components and/or features may have the same reference label. Further, various components of the same type may be distinguished by following the reference label by a second label that distinguishes among the similar components. If only the first reference label is used in the specification, the description is applicable to any one of the similar components having the same first reference label irrespective of the second reference label.

DETAILED DESCRIPTION

In the following description, numerous specific details are set forth to provide a thorough understanding of various embodiments. However, one having ordinary skill in the art should recognize that the invention can be practiced without these specific details. In some instances, circuits, structures, and techniques have not been shown in detail to avoid obscuring embodiments.

A number of conventional approaches exist for identifying and/or distinguishing between nominally identical objects such as paper, pigmented coatings, textiles, and other such materials. Some such approaches examine latent (i.e., inherent, substantially random, substantially non-clonable) structure of those objects. One category of conventional approaches involves specialized optics, such as microscopes, for examination of an object to reveal its latent structure. A second category of conventional approaches collect multiple optical measurements under controlled illumination conditions and specific arrangements of light source(s) and/or imager(s) relative to the object. For example, when collecting multiple images of an object, those images will be affected by various components of the object and the optical environment, including (a) the object's structure (including latent structure), (b) the object's reflectance properties; and (c) ambient and/or other lighting contexts. Accordingly, the second category of conventional approaches typically uses defined (e.g., repeatable) optical arrangements to collect images. Further such approaches typically rely on complex post-processing to separate and remove effects of the ambient and/or other lighting contexts (i.e., component (c)); then further complex processing (e.g., photometric stereo processing) to separate and remove effects of the object's reflectance properties (i.e., component (b)); thereby leaving an estimate or other type of characterization of the object's structure (i.e., from component (a)). These and other conventional approaches have found limited application, for example, because specialized optics and/or complex post-processing can involve appreciable cost, complexity, etc.

Embodiments described herein include techniques for authenticating (e.g., identifying and/or verifying the identity of) objects based on their latent structure without relying on specialized equipment, specific lighting conditions, or precise numbers or types of images of the object. For example, some embodiments can use sets of images acquired using ubiquitous mobile device optics, such cameras of smartphone, tablets, and wearable imaging systems (e.g., glasses and/or headsets with integrated imaging capabilities, smart watches with integrated imaging capabilities, etc.). Further, some embodiments can authenticate objects (i.e., including determining whether there is a match between two such sets of images) using processing that is sufficiently computationally efficient to be performed locally and quickly on devices that may have limited computational resources.

As one illustration, suppose it is desired to authenticate a printed contract. Conventionally, the authentication could involve verifying signatures, seals, document contents, watermarks, etc. Using embodiments described herein, the paper on which the contract was originally printed and executed can be enrolled using latent structural characterization techniques. At the time of authentication, the contract can be analyzed according, again, to latent structural characterization techniques. In this way, the authentication can further (or alternatively) involve determining, for example, whether the paper on which the contract is printed is the exact same piece of paper on which the contract was originally executed. For example, each piece of even the same type of paper inherently has small differences in the numbers, types, orientations, etc. of its fibers, pulp, inclusions, etc. These small differences in its latent structure can impact how the paper reacts to different optical geometries, so that characterizing those reactions can act as an analog to characterizing those latent structures.

As another example, suppose it is desired to authenticate a painting as one stolen from a gallery, or to prove that a painting is a forgery. Conventionally, the authentication could involve looking for signatures or other markings; analyzing the artwork using x-rays or other special optics; etc. Using embodiments described herein, the latent structural characteristics of the current painting (i.e., the purported authentic) can be compared to latent structural characteristics of a previously enrolled (i.e., known authentic) painting, thereby determining, for example, that a region of paint is statistically the exact same paint applied to the canvas in the exact same way (i.e., a statistically non-clonable characteristic). As yet another example, suppose it is desired to authenticate a passport (or national identification card, employee credential, etc.) for access control. Conventionally, the authentication could involve looking for security features, such as a user's photo, holograms, signatures, identification numbers, embedded circuits, etc. Using embodiments described herein, the latent structural characteristics of the substrate of the credential being presently presented (i.e., the purported authentic) can be compared to latent structural characteristics of a previously enrolled credential (i.e., known authentic; enrolled at the time of issuance). For example, forging the credential to circumvent such authentication could require, not only producing a fake credential with matching security features, but forming the fake credential from the same portion of the same substrate used to form the original.

The techniques described herein can be used to authenticate a wide variety of objects having inherent latest structural characteristics (e.g., fibers of a piece of paper, etc.) or imposed latent structural characteristics (e.g., a painted on metal fleck coating, etc.). Accordingly, while terms like "document," "credential," and the like are used in context of the claims and various embodiments, such terms are intended to broadly include any object authenticatable by the techniques described herein and their variants. For example, the same techniques can be applied to authenticate, according to latent structural characteristics, a particular bottle of wine, a particular physical recording medium, a particular piece of currency (e.g., a paper bill, a bank note, a check, etc.), a contract (e.g., and/or the paper on which the contract is printed), a particular ceramic article, a particular archaeological artifact, a particular machine part, a credit card, a national identification card, a passport, a visa, an access credential, a radiofrequency identification (RFID) token, etc.

Many other similar contexts exist in which latent structural characteristics can be used to identify an object from among a number of near-identical instances. For example, suppose a number of invites are identically printed on cardstock for an exclusive event (i.e., it is practically impossible for a person to discern one invite from another by visual inspection). While the invites look identical, small differences inherently exist between each piece of cardstock on which an authentic invite is printed, and differences also exist between the pieces of cardstock used for those authentic invites and any other piece of cardstock. Accordingly, techniques described herein can be used, not only to verify whether a presented invite is authentic, but further to identify which of the printed invites matches the one being presented. As another example, suppose a manufacturer suspects its factory is being used at night to produce identical knock-offs of its products for unauthorized sale. The manufacturer can enroll (i.e., compute and store in a database, as described below) a latent structural characterization of each product as it comes off the assembly line during authorized manufacturing hours. If the manufacturer subsequently seizes a suspected knock-off, it can use latent structural characterization techniques described herein to determine whether this particular instance of the product matches one of the large number of enrolled (known authentic) instances, without relying on relatively easy-to-spoof markings, integrated tagging electronics, or the like. In these and many other contexts, the latent structure can be exploited as a physically unclonable (i.e., statistically unclonable) characteristic of an object.

FIG. 1 shows a block diagram of an object authentication environment 100 having an enrollment/authentication system 110, according to various embodiments. For the sake of clarity, a single enrollment/authentication system 110 is shown for performing both enrollment and authentication functions of various embodiments described herein. Those functions can be performed by any suitable number of systems and can be distributed among those systems in any suitable manner. Embodiments of the enrollment/authentication system 110 can be used to enroll one or more enrollment objects 105, and, subsequently, to authenticate one or more authentication objects 155. As used herein, authenticating an authentication object 155 can include determining whether a particular authentication object 155 matches a particular enrollment object 105 (e.g., authenticating that the object is as purported, verifying the identity of an object, etc.), determining whether a particular authentication object 155 fits in a group of enrollment objects 105 (e.g., categorizing the object by its latent structure), determining which of some or all enrollment objects 105 matches a particular authentication object 155 (e.g., identifying an object), or the like.

As illustrated, embodiments of the enrollment/authentication system 110 include an image acquisition system 120, an image stack generator 130, a latent structural analyzer 140, an authentication subsystem 150, and one or more data stores (e.g., an image data store 125 and a magnitudes store 145). Embodiments of the image acquisition system 120 can include any suitable imaging devices and related optics, such as still cameras, video cameras, charge coupled devices (CODs), lenses, filters, etc. Further, the image acquisition system 120 can include lighting, such as a flash and/or one or more other illumination sources. According to some embodiments, a series of images (e.g., multiple still images, or a video) of an object (i.e., the enrollment object 105 or the authentication object 155) can be collected while there is a change in optical geometry between the object, imager, and light source(s). For example, a smart phone, digital camera, or other device can be used to acquire still images or video of the same object from different directions, and each direction can yield a respective optical geometry.

As used herein, "optical geometry" refers generally to the relative positions of the object, imager, and light source(s). For example, a change in optical geometry can include relative motion between the object and the imager, relative motion between the object and a primary light source, etc. In one embodiment, the image acquisition system 120 can have a primary light source that is in a fixed location relative to an imager, such as in the case of a smart phone flash and smart phone camera, such that both move together (e.g., in substantially fixed relation to each other) to collect a series of different images of the object from different directions. In such an embodiment, changes in optical geometry involve relative motion between the object and the combined imager and light source (though, even if the imager and light source are in fixed relationship to each other, a change in the orientation of the image acquisition system 120 relative to the object can effect relative motion of the light source to the imager with respect to the object). In another embodiment, the image acquisition system 120 can have a primary light source that is either in a fixed or movable location, but is separate from the imager, so that there can relative movement between any or all of the object, imager, and light source(s). In still another embodiment, ambient lighting (e.g., including perhaps variable shadowing by the person acquiring the image data and other contextual features) can be an additional, or the only, light source(s). Some implementations can include additional elements to improve, or otherwise support image acquisition (e.g., crossed polarizers to reduce glare, etc.).

According to some embodiments, there is no required or fixed number of images that must be acquired. However, certain functionality may be more effective with at least a minimum number of images. For example, effective authentication of objects according to techniques described herein have been demonstrated with as few as six images. In some contexts (e.g., depending on the expected amount of difference in latent structure between an authentic object and an inauthentic object, depending on whether the techniques are being used for identification versus verification of identity, etc.), more or fewer images may be determined as optimal. The optimal number of images can be a balance between higher authentication confidence (i.e., in general, more images can yield higher confidence) and minimizing acquisition resources (e.g., requiring more images can increase the time it takes to collect the images, the computing resources used to process the images, the storage resources used to store the image data and/or other relevant information, etc.). Some implementations can permit (or require) a larger set of images to be acquired, and can select a best subset of images from that set for use in authentication and/or enrollment. For example, acquired images can be analyzed for too much glare, lack of focus, and/or other undesirable characteristics. In some embodiments, the image acquisition system 120 can provide real-time feedback to the user during image/video acquisition, which can include guidance on image acquisition (e.g., indicating to the user to move the device transversely or axially; indicating a speed of motion; indicating a duration of an acquisition interval; indicating a present quality of raw images with respect to focus, glare, brightness, etc.; indicating when a sufficient number and/or quality of images has been acquired; etc.). In some embodiments, some or all of the acquired images can be stored in the image data store 125.

Once a suitable set of images is collected (or extracted from a video sequence), embodiments of the image stack generator 130 can generate an image stack by aligning the images of the object to an image reference framework. The images can be aligned according to any suitable spatial registration technique, so that a particular spatial location (e.g., a pixel location) in one of the images corresponds to a comparable spatial location (e.g., substantially the same pixel location) in all the other images of the stack. For example, a Speeded Up Robust Features (SURF), Scale-Invariant Feature Transform (SIFT), or other approach can be used to identify common features across images that can be used to reliably align (e.g., transform, map, register, etc.) each image to the image reference framework. In some implementations, one of the images in the stack is selected as the image reference framework (e.g., for image set $\{I_1 \ldots I_N\}$; images $\{I_2 \ldots I_N\}$ are registered to $I_1$). Before or after the registration step the images can be processed in some manner, for example, including converting from color to black-and-white (or greyscale), spatial filtering, noise filtering, image enhancement, etc. As described above, each image in the stack (or at least a sufficient number of images in the stack) is acquired with a different respective optical geometry. By aligning the images, a comparable (i.e., substantially identical) region of the object can be analyzed across the images in the stack in a manner that reveals the changes in response of that region over the different optical geometries represented by the images.

In some embodiments, the registered images (the "image stack") are stored in the image data store 125. For example, the image stack can be stored in addition to, or instead of (e.g., in replacement of), the raw acquired images. Some implementations store the image stack only temporarily to support latent structural analysis (as described below), while other implementations store the image stack in a longer-term manner (e.g., permanently) that permits future (e.g., later-requested) latent structural analysis.

Embodiments of the latent structural analyzer 140 use the image stack to compute a set of basis functions on a region of the image stack in such a way that describes latent structural characteristics of the region. The region can be selected in any suitable manner, for example, to select enough pixels to provide useful authentication without selecting too many pixels to be efficiently processed using the resources of the image stack generator 130, latent structural analyzer 140, and/or authentication subsystem 150. In some implementations, a substantially "blank" region is selected. For example, the selected region may be a region of a document that has no writing (e.g., blank paper), a region of a credit card having no personalization information (e.g., blank stock), a region of a semiconductor having no circuitry, etc. As described more fully below, authentication can involve an enrollment stage and an authentication stage. The region selected in the authentication stage can represent a substantially identical set of locations on the object as those selected for the region during the enrollment stage, or the region selected in the authentication stage can represent locations that are sufficiently comparable to (i.e., expected or known to have latent structure that is sufficiently similar as to be useful for authentication) those selected as the region during the enrollment stage. The locations that make up the region are typically contiguous, but can, in some implementations, include multiple discontinuous sub-regions.

In some embodiments, computing the set of basis functions involves generating a set of arrays (e.g., matrices) that describe a magnitude (e.g., intensity value, color value, binary black or white value, etc.) for each spatial location (e.g., pixel location, pixel grouping location, etc.) in the region for each image in the stack, according to the basis (e.g., coordinate system) defined by the image reference framework. Stated differently, computing the set of basis functions can include converting the plurality of images to a pixel dataset defining a pixel intensity for each of a plurality of pixel locations in the region for each of the plurality of images. For example, suppose the image stack includes six greyscale images, and a spatial region is selected that includes 100,000 pixel locations, so that the same region of each image in the stack can define a corresponding greyscale intensity level for each pixel location. Accordingly, the set of basis functions can be six 1-by-100,000 matrices. As described further herein, these basis functions and their magnitudes describe (indirectly) latent structural characteristics of the object at least because latent structural characteristics of the object manifest as latent relationships between the pixel intensities over the region in each image. Accordingly, the basis functions can be used to reveal effects of characteristics of the latent structure of the object without actually determining or describing the latent structure itself.

In other embodiments, computing the set of basis functions involves performing a latent variable decomposition to generate a set of functions in a basis relating to the latent structural characteristics of the object. Some such embodiments perform an eigenanalysis to extract a set of variables that correspond to characteristic components of latent structure of the object. For example, principal component analysis techniques can orthogonally transform the raw pixel data from the image stack into values of linearly uncorrelated variables representing those components of the raw pixel data that contribute most to the variability in the data (i.e., the principal components relating to the data's variance). Such analysis result in a set of vectors with magnitudes, such as a set of eigenvectors and eigenvalues (e.g., the set is an uncorrelated orthogonal basis set when generated from a principal component analysis). In some embodiments, the latent structural analyzer 140 can perform a latent structural analysis on the image stack to compute a set of basis functions and magnitudes, which can reveal in which ways the raw pixel data were most impacted by their internal latent relationships over changes in optical geometry. Those revealed impacts can correspond to, and describe (indirectly), latent structural characteristics of the object. Again, such basis functions and their magnitudes can reveal effects of characteristics of the latent structure of the object without actually determining or describing the latent structure itself.

The latent structural analyzer 140 can compute the set of basis functions as part of an enrollment stage and/or as part of an authentication stage. During the enrollment stage, one or more objects can be enrolled with the enrollment/authentication system 110, thereby becoming enrollment object(s) 105. During the authentication stage, it is desired to authenticate one or more authentication objects 155 (i.e., these may be the same enrollment objects 105, purportedly the same enrollment objects 105, similar to the enrollment objects 105, etc.). In some implementations, if authentication of an authentication object 155 fails during the authentication stage, the enrollment/authentication system 110 can enroll it as a new enrollment object 105 (e.g., automatically, in response to prompting a user, etc.). Similarly, during the enrollment stage, some implementations of the enrollment/authentication system 110 can attempt to authenticate the enrollment object 105 (i.e., treat it as an authentication object 155), for example, to avoid enrolling duplicate objects (e.g., potentially resulting in failed enrollment, an indication to the user that "this object as already been enrolled," or the like).

In some embodiments, the latent structural analyzer 140 extracts and outputs magnitudes from the basis functions that are useful in finding latent structural correlations between enrollment objects 105 and authentication objects 155. The magnitudes can be stored in a magnitudes store 145. Embodiments of the authentication subsystem 150 can be used to verify the purported identity of an authentication object 155 is what it is purported to be by comparing the latent structural characteristics of the authentication object 155 to those of an enrollment object 105 (previously enrolled and stored); and/or to determine the identity of an authentication object 155 by comparing the latent structural characteristics of the authentication object 155 to those of a candidate set of enrollment objects 105 (previously enrolled and stored). Such identification and/or verification of identity can involve computing a mathematical correspondence between magnitudes extracted from basis functions computed to describe latent structural characteristics from an enrollment object 105 and magnitudes extracted from basis functions computed to describe latent structural characteristics of an authentication object 155.

Computing a mathematical correspondence between enrollment and authentication magnitudes can be performed in any suitable manner to seek a statistical "fit" between the data sets. Some embodiments compute correlation coefficients between the magnitude data sets. The computation may or may not depend on the types of magnitudes being used. As described above, each extracted set of magnitudes can be generated from eigenanalysis (e.g., principal component analysis) or raw pixel data (e.g., according to a pixel basis set). In one implementation, the extracted set of magnitudes corresponding to the enrollment object 105 ("M1") is generated from an eigenanalysis, and the extracted set of magnitudes corresponding to the authentication object 155 ("M2") represents the pixel values in a pixel basis set. In another implementation, M2 is generated from eigenanalysis, and M1 represents the pixel values in a pixel basis set. In another implementation, M1 and M2 are both generated from eigenanalysis (e.g., one is from a linear combination of eignevectors and eigenvalues). In another implementation, M1 and M2 both represent the pixel values in respective pixel basis sets.

Having extracted the magnitudes, embodiments of the authentication subsystem 150 can compute the one or more mathematical correspondence between the magnitude data sets and use that computation to authenticate the authentication object 155. The authentication subsystem 150 can use a fitting function to generate a fit score (e.g., a linear least-squares fit can be used to generate a correlation coefficient). In some embodiments, computing the mathematical correspondence comprises generating a fitting function between the first and second magnitudes and computing a correlation coefficient from the fitting function. One can then determine that the authentication object is the enrollment object by, for example, determining if the correlation coefficient exceeds a predetermined threshold value. In one implementation, M1 extracted from one of the images in the enrollment object 105 image stack can be correlated against a linear combination of M2$s$ extracted from some or all images in the authentication object 155 image stack to generate a fit score. In a second type of implementation, M2 extracted from one of the images in the authentication object 155 image stack can be correlated against a linear combination of M1$s$ extracted from some or all images in the enrollment object 105 image stack to generate a fit score. In a third type of implementation, each of a set (some or all) of the M1$s$ (or M2$s$) extracted from corresponding images in the enrollment object 105 (or authentication object 155) image stack can be correlated against a linear combination of M2$s$ (or M1$s$) extracted for some or all images in the authentication object 155 (or enrollment object 105) image stack to generate a fit score. In such a third type of implementation, the set of comparisons can yield a set of fit scores (e.g., a set of correlation coefficients). Some such implementations can use some or all of those fit scores, the maximum of those fit scores, an average of those fit scores, or any other suitable value derived from those fit scores as a "final" fit score for the authentication. For example, the fit score can be defined as a function of a maximum correlation determined from the plurality of correlations, or as a function of the average maximum correlation determined from the plurality of correlations. The various types of implementations are described as using "linear" combinations assuming that the magnitudes were extracted from basis functions generated from linear decompositions. In other embodiments, however, implementations can use non-linear decompositions and non-linear combinations, accordingly. According to various embodiments, the fit(s) between one or more M1 and one or more M2 can be linear, polynomial, exponential, or any other suitable function.

Embodiments of the authentication subsystem 150 can determine whether the authentication object 155 is the enrollment object 105 as a function of the mathematical correspondence. Such a determination can involve determining that the authentication object 155 is the enrollment object 105 when the mathematical correspondence indicated higher than some threshold degree of fit (i.e., the extent to which M1 and M2 are considered to correspond). The degree of fit can assessed using any suitable technique. For example, the degree of fit can be a correlation coefficient, and the determination can be based on a predetermined threshold correlation value, a threshold value determine by machine learning or some other feedback mechanism, etc.

While FIG. 1 shows a particular architecture having a single, combined enrollment/authentication system 110, many other architectures can be used for other contexts. The architecture of FIG. 1 can be employed in contexts where a particular, single device can be used for enrollment and/or authentication, depending on context. As one example, a smart phone, tablet computer, or other portable electronic device can be configured for enrollment and/or authentication of objects "in the field" (e.g., for use by parties to a transaction in enrolling and/or authenticating contracts and/or other objects relating to the transaction). As another example, a dedicated device (or a non-dedicated, portable electronic device, as in the preceding example) can be located as a point of entry, a certification authority, or the like, and can be used to enroll credentials and/or other objects and to later authenticate those credentials and/or other objects. In other contexts, various enrollment and authentication functions can be distributed among multiple systems. For example, enrollment functions can be performed in a relatively centralized fashion (e.g., in one or a limited number of locations, by one or a limited number of systems, etc.), which can help maintain control and visibility over which objects are enrolled, by whom, etc. While the enrollment is relatively centralized, it can be desirable to de-centralize the authentication. For example, it can be desirable to provide many (e.g., any) users with the ability to authenticate objects in the field, while limiting the number of users permitted to enroll objects. Various illustrative de-centralized authentication approaches are described in FIGS. 2-4.

Figure 2:
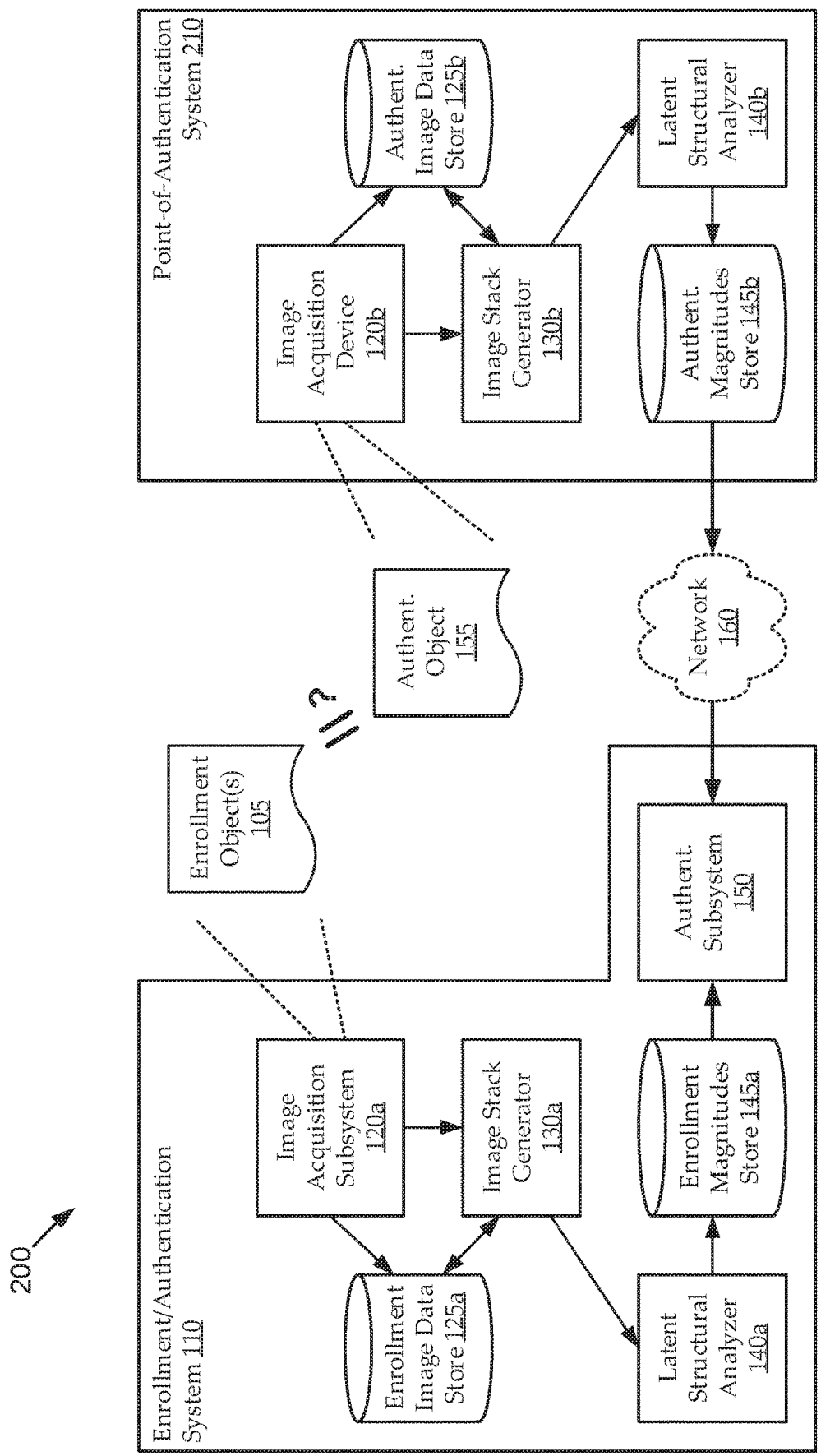
FIG. 2 shows an illustrative object authentication environment that provides de-centralized authentication by distributing some authentication functions between an enrollment/authentication system and a point-of-authentication (POA) system, according to various embodiments.

FIG. 2 shows an illustrative object authentication environment 200 that provides de-centralized authentication by distributing some authentication functions between an enrollment/authentication system 110 and a point-of-authentication (POA) system 210, according to various embodiments. As illustrated, the enrollment/authentication system 110 can be implemented as an embodiment of the enrollment/authentication system 110 described with reference to FIG. 1, and the POA system 210 can be implemented with some of the same functionality as that of the enrollment/authentication system 110 of FIG. 1. The POA system 210 can be in communication with the enrollment/authentication system 110 directly (e.g., by a wired or wireless connection) and/or via a network 160 (e.g., a public or private, wired or wireless, and/or any other suitable network 160). In one implementation, the POA system 210 is implemented as a client system, the enrollment/authentication system 110 is implemented as a server system, and the communications are client/server communications of the network 160 (e.g., the Internet) using standard network communications protocols.

As illustrated, embodiments of the enrollment/authentication system 110 and the POA system 210 can each include a respective instance of an image acquisition system 120, an image stack generator 130, a latent structural analyzer 140, and various data stores. The respective instances can be implemented identically or differently. For example, respective implementations of the image acquisition system 120 can specifically be adapted to the types of image acquisition components available to the respective system (e.g., each system can have a different type of camera, different optics capabilities, different resolutions, different lighting components and/or controls, etc.). As another example, certain functions can be implemented in hardware in one system (e.g., in the enrollment/authentication system 110) and in software in the other system (e.g., in the POA system 210); or as a robust, full-featured implementation in one system (e.g., in the enrollment/authentication system 110) and as a thin client, or the like, in the other system (e.g., in the POA system 210). Embodiments of the enrollment/authentication system 110 can include further centralized functions, such as the authentication subsystem 150.

For the sake of illustration, suppose the enrollment/authentication system 110 is located in a headquarters building, where employees are issued credentials. Upon issuance, each credential is enrolled using the enrollment/authentication system 110. For example, images of the credential (i.e., the enrollment object 105) are acquired by the image acquisition system 120a and registered (e.g., and/or otherwise processed) into an image stack by the image stack generator 130a, and the raw images and/or image stack can be stored in an enrollment image data store 125a. In some embodiments, at substantially the same time (e.g., concurrently, as part of a nightly batch process, etc.), the enrollment image stack data is used by the latent structural analyzer 140a to compute basis functions and to extract enrollment magnitudes, which can be stored in an enrollment magnitudes store 145a. Some implementations can store only the enrollment magnitudes (i.e., the enrollment image data is not stored at all, or is stored only temporarily). In some embodiments, processing by the latent structural analyzer 140a is not performed until needed for authentication. For example, the enrollment image data (e.g., raw images and/or image stack) are stored in the enrollment image data store 125a and are used for processing by the latent structural analyzer 140a on-demand as part of any subsequent enrollment attempt.

Subsequently, suppose the credential is presented for access to some secured asset (e.g., a building, file, etc.), and access control involves authenticating the credential using the POA system 210 located in proximity to the secured asset. Similar to the enrollment, images of the credential (i.e., now the authentication object 155) are acquired by the image acquisition system 120b and registered (e.g., and/or otherwise processed) into an image stack by the image stack generator 130b, and the raw images and/or image stack can be stored in an authentication image data store 125b. The authentication image stack data can be used by the latent structural analyzer 140b to compute basis functions and to extract authentication magnitudes, which can be stored in an authentication magnitudes store 145b. Some implementations can store only the authentication magnitudes (i.e., the authentication image data is not stored at all, or is stored only temporarily), or the authentication image data (e.g., raw images and/or image stack) can also be maintained in storage for any suitable time in any suitable data store (e.g., in the authentication image data store 125b, the enrollment image data store 125a, etc.). Some embodiments only store the authentication magnitudes and/or authentication image data for an amount of time that supports the authentication process, and does not maintain that data subsequent to authentication (e.g., or only maintains certain portions of the data, log data, etc.).

The extracted authentication magnitudes can be communicated (e.g., over the network 160) to the authentication subsystem 150 of the enrollment/authentication system 110. As described above, the authentication subsystem 150 can compute a mathematical correspondence (e.g., a fit score) between the received authentication magnitudes and enrollment magnitudes (e.g., retrieved from the enrollment magnitudes store 145a). In some implementations, the received authentication magnitudes are associated (e.g., tagged) with an identifier to assist the authentication subsystem 150 in determining which enrollment object 105 to authenticate against. For example, as part of acquiring the authentication images by the image acquisition system 120b, one or more identifiers can also be recorded. In one implementation, the identifier(s) can be recorded manually by a user of the POA system 210 (e.g., the credential holder can provide a password, signature, biometric, etc. via an interface; an operator of the POA system 210 can enter information about the credential and/or credential holder via an interface; etc.). In another implementation, the identifier(s) can be received from the credential itself (e.g., by inserting the credential into a reader, swiping a magnetic strip or ink through a reader, placing a radiofrequency identification (RFID) chip of the credential near a reader, etc.), from another credential (e.g., a second form of identification), from images of the credential (e.g., the images can be automatically analyzed, before or after registration as the stack, to find a photo, identification number, and/or any other suitable identifier in the images), etc. Similar or different techniques can be used during enrollment to associated enrollment data with a particular enrollment object 105 in storage.

In other embodiments, the authentication subsystem 150 attempts to authenticate the authentication object 155 against some or all stored enrollment objects 105. For example, the enrollment/authentication system 110 may have data stored for only one enrollment object 105 against which any authentication is performed (e.g., where the systems are being used to find one particular authentic object). In another example, each authentication object 155 is initially assumed to be one of some limited number of enrollment objects 105, and the authentication is used to determine which of those enrollment objects 105 is the matching candidate. In other implementations, any suitable technique can be used to narrow a set of candidate enrollment objects 105 against which to authenticate the authentication object 155 from a larger number of stored enrollment object data. For example, if the authentication object 155 is used to authenticate visas and passports from a number of countries, analysis of the authentication images acquired from the authentication object 155 (e.g., color, shape, size, locations of features, etc.) can indicate which category of authentication object 155 is being presented to the POA system 210, which can be used to narrow the number of candidate matching enrollment objects 105 to only those of the same category (e.g., only visas from a particular country).

Figure 3:
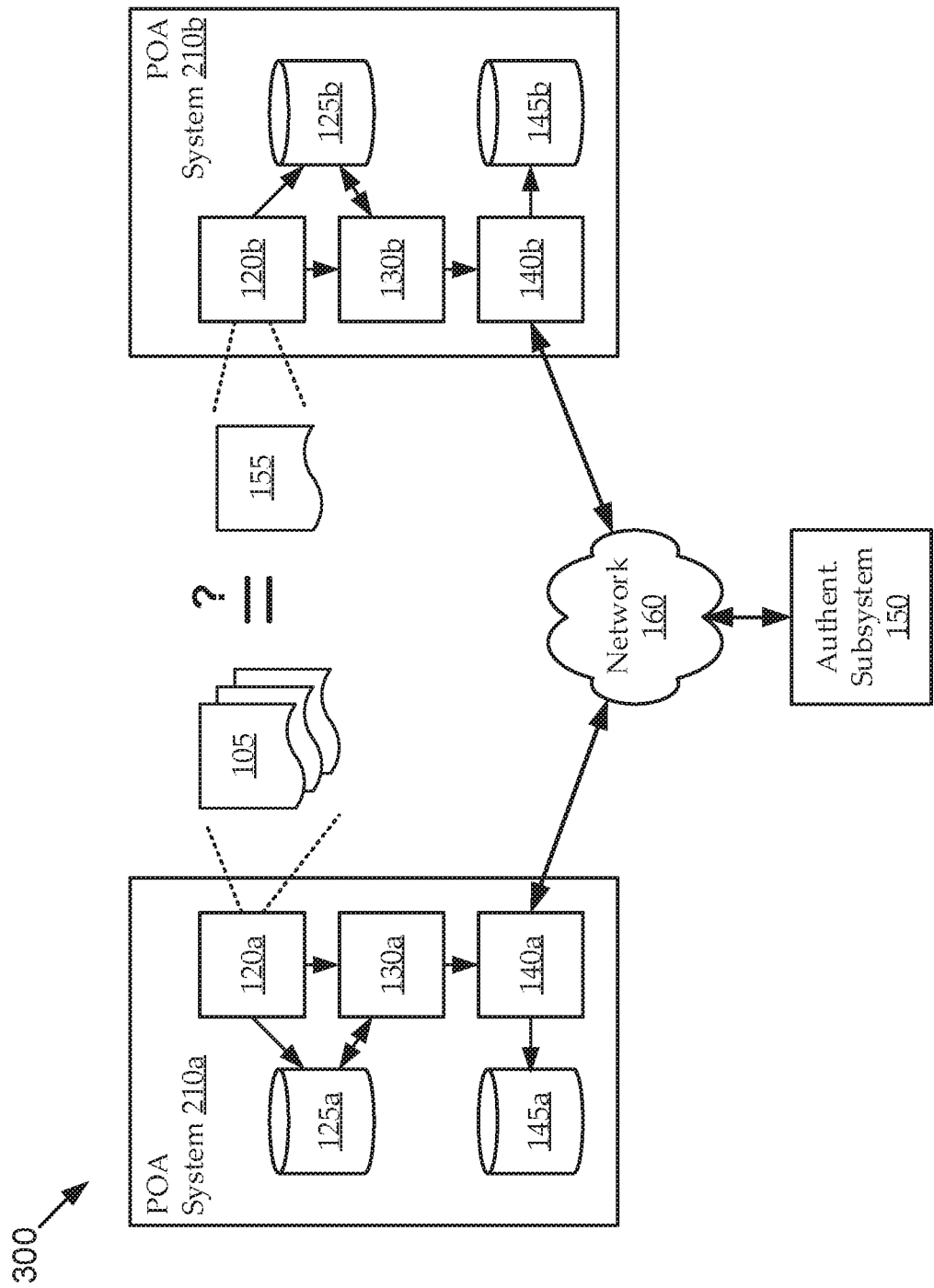
FIG. 3 shows another illustrative object authentication environment that provides de-centralized authentication by distributing most enrollment and/or authentication functions to each of multiple POA systems, according to various embodiments.

FIG. 3 shows another illustrative object authentication environment 300 that provides de-centralized authentication by distributing most enrollment and/or authentication functions to each of multiple POA systems 210, according to various embodiments. Embodiments can include multiple POA systems 210, and each can be implemented substantially as the POA system 210 of FIG. 2. In any particular transaction with an object, the POA system 210 can act as an enrollment system or an authentication system. For example, as illustrated, a first POA system 210a can act as an enrollment system to enroll an enrollment object 105 by acquiring images of the enrollment object 105 using an image acquisition system 120a, aligning the images into an image stack using an image stack generator 130a (e.g., which can be stored in an enrollment image data store 125a), and computing basis functions and extracting enrollment magnitudes using a latent structural analyzer 140a (e.g., which can be stored in an enrollment magnitudes store 145a). Subsequently, a second POA system 210b (e.g., similar to or identical to the first POA system 210a) can act as an authentication system to authenticate an authentication object 155 (e.g., purported to be the enrollment object 105) by acquiring images of the authentication object 155 using an image acquisition system 120b, aligning the images into an image stack using an image stack generator 130b (e.g., which can be stored in an authentication image data store 125b), and computing basis functions and extracting authentication magnitudes using a latent structural analyzer 140b (e.g., which can be stored in an authentication magnitudes store 145b).

The multiple POA systems 210 can be in communication with an authentication subsystem 150 (and/or with each other) either directly, via a network 160, and/or in any other suitable manner. For example, each POA system 210 is a mobile or fixed client device that can be in communication (e.g., as needed, persistently, or in any other suitable manner) with the authentication subsystem 150 implemented in a network-accessible server or servers (e.g., via a private network, via the cloud, etc.). Embodiments of the authentication subsystem 150 can receive the enrollment and authentication magnitudes from the POA systems 210, and can compute a mathematical correspondence (e.g., a fit score) according to which it can determine whether to authenticate the authentication object 155. For example, the second POA system 210b can send an authentication request (e.g., along with authentication magnitudes) to the authentication subsystem 150. In response, the authentication subsystem 150 can request relevant enrollment magnitudes from the first POA system 210a (and/or from any suitable location). The authentication subsystem 150 can then compute the fit score and determine whether to authenticate the authentication object 155. In response to the determination, the authentication subsystem 150 can send an indication to the second POA system 210b, which can indicate the result to a user (e.g., by illuminating a corresponding indicator, sounding a corresponding audible indication, displaying an indication on a display, etc.).

Figure 4:
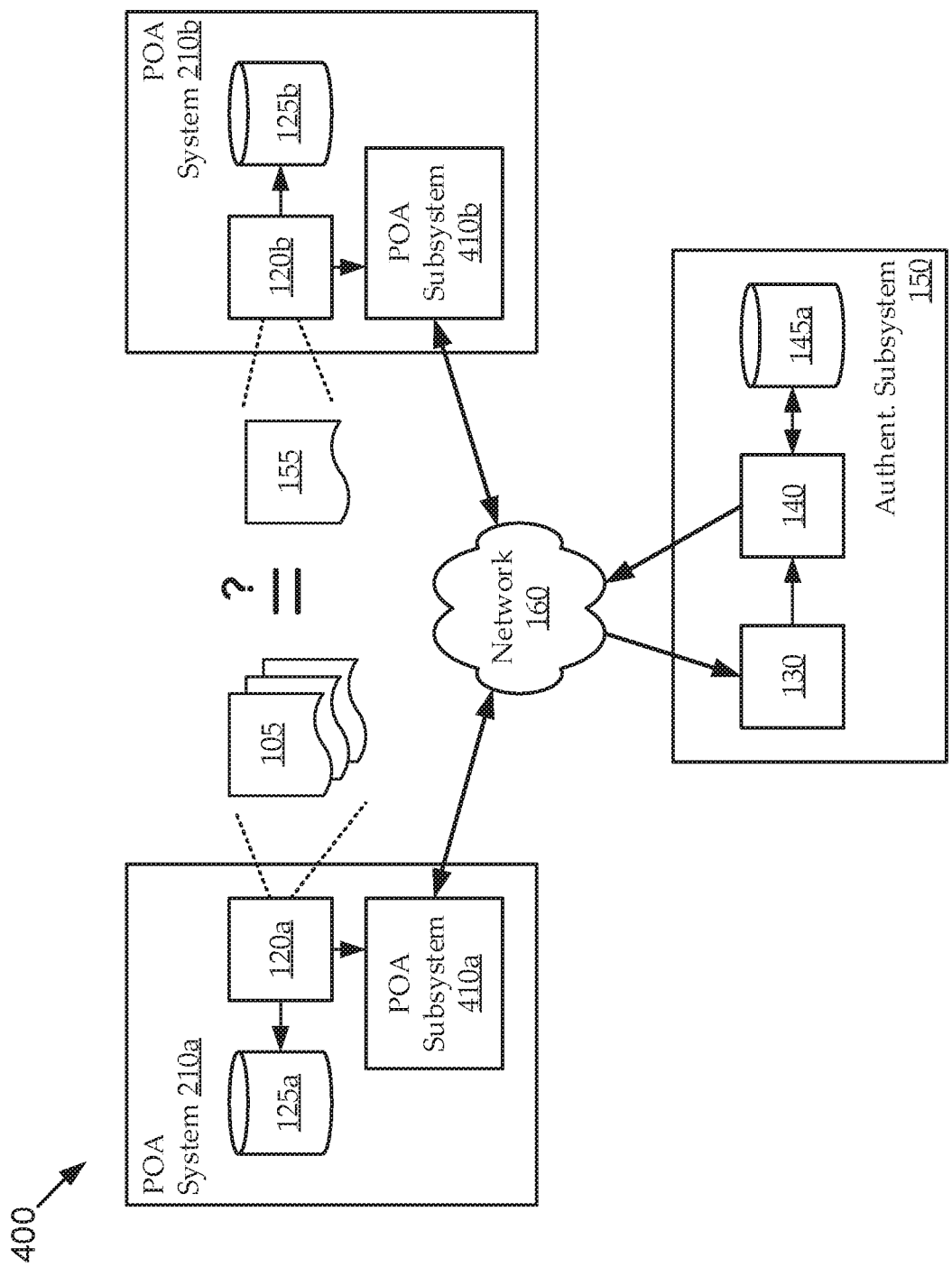
FIG. 4 shows another illustrative object authentication environment that provides de-centralized authentication by maintaining centralization of most authentication functions, while still distributing certain enrollment and/or authentication functions, according to various embodiments.

FIG. 4 shows another illustrative object authentication environment 400 that provides de-centralized authentication by maintaining centralization of most authentication functions, while still distributing certain enrollment and/or authentication functions, according to various embodiments. As in FIG. 3, embodiments can include multiple POA systems 210, but each has more limited functionality than those described with reference to FIG. 3. In any particular transaction with an object, each POA system 210 can act as an enrollment system or an authentication system. For example, as illustrated, a first POA system 210a can act as an enrollment system to enroll an enrollment object 105 by acquiring images of the enrollment object 105 using an image acquisition system 120a (e.g., and optionally storing the images in an enrollment image data store 125a). Acquisition of the images (e.g., including providing acquisition guidance, user interface control, and/or other functions) can be directed by a POA subsystem 410a (e.g., in an enrollment mode). The acquired enrollment images can be communicated by the POA subsystem 410a (e.g., directly or via a network 160) to an authentication subsystem 150. Subsequently, a second POA system 210b can act as an authentication system to authenticate an authentication object 155 by acquiring images of the authentication object 155 using an image acquisition system 120b (e.g., and optionally storing the images in an authentication image data store 125b). Acquisition of the images (e.g., including providing acquisition guidance, user interface control, and/or other functions) can be directed by a POA subsystem 410b (e.g., in an authentication mode). The acquired authentication images can be communicated by the POA subsystem 410b (e.g., directly or via the network 160) to the authentication subsystem 150.

As illustrated, embodiments of the authentication subsystem 150 can centralize (e.g., include) the image stack generator 130 and the latent structural analyzer 140. For example, the authentication subsystem 150 can receive the enrollment image data from the POA subsystem 410a during enrollment, during authentication, or at any other suitable time. After receipt of the enrollment image data, the authentication subsystem 150 can align the images into an image stack using the image stack generator 130 and compute basis functions and extract enrollment magnitudes using the latent structural analyzer 140 (e.g., which can be stored in an enrollment magnitudes store 145a). After receipt of the authentication image data, the authentication subsystem 150 can align the images into an image stack using the same image stack generator 130 and compute basis functions and extract authentication magnitudes using the same latent structural analyzer 140. The authentication subsystem 150 can then compute a mathematical correspondence (e.g., a fit score) between the extracted authentication magnitudes and the stored enrollment magnitudes, according to which it can determine whether to authenticate the authentication object 155. As in FIG. 3, the authentication subsystem 150 can send an indication to the second POA system 210b (e.g., to the POA subsystem 410b), which can, in turn, indicate the result to a user.

Figure 5:
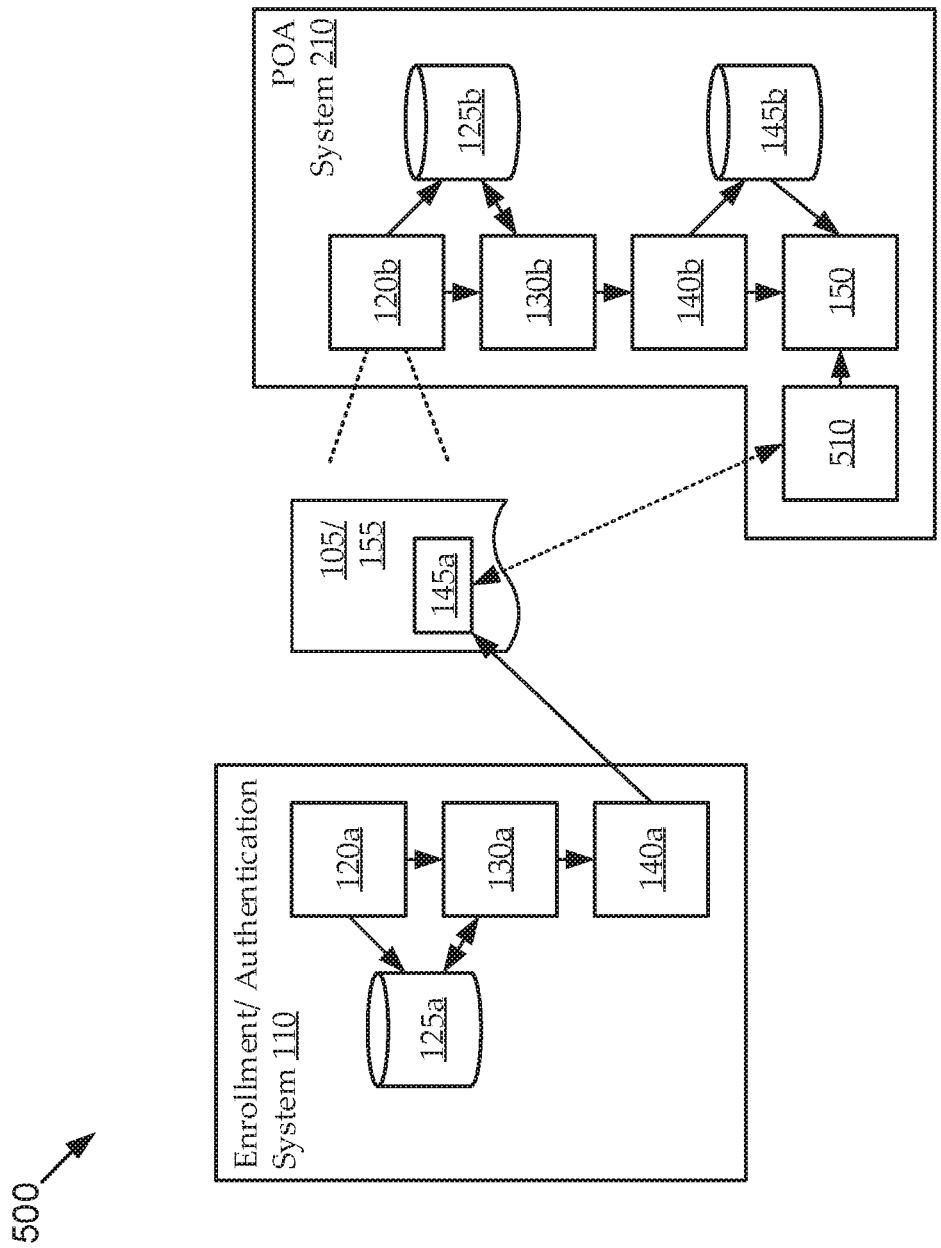
FIG. 5 shows another illustrative object authentication environment that provides de-centralized authentication by integrating enrollment data into an enrolled object, according to various embodiments.

The embodiments described in FIGS. 1-4 assume that enrollment data (e.g., enrollment magnitudes) is stored separate from the object itself. In some implementations, the enrollment data can be affixed to, printed on, embedded in, or otherwise integrated with the enrollment object itself. FIG. 5 shows another illustrative object authentication environment 500 that provides de-centralized authentication by integrating enrollment data into an enrolled object, according to various embodiments. As in embodiments described above, an enrollment/authentication system 110 (e.g., a first POA system 210 acting in such a capacity, or a dedicated system for enrollment) can enroll an enrollment object 105 by acquiring images of the enrollment object 105 using an image acquisition system 120a (e.g., and optionally storing the images in an enrollment image data store 125a), aligning the images into an image stack using an image stack generator 130a (e.g., which can optionally be stored in the enrollment image data store 125a along with, or instead of, the raw images), and computing basis functions and extracting enrollment magnitudes using a latent structural analyzer 140a.

As illustrated, the enrollment magnitudes (e.g., and/or any other data acquired as part of the enrollment and usable by an authentication system 150 in characterizing latent structure for authentication) can be stored in an enrollment magnitudes store 145a integrated in the enrollment object 105 itself. The enrollment magnitudes store 145a can be integrated in the enrollment object 105 in any suitable manner. For example, the enrollment magnitudes (and/or other enrollment data) can be encoded in a printed code (e.g., a barcode, quick response (QR) code, alphanumeric string, machine-readable text or graphics, etc.), stored in an embedded memory (e.g., an RFID chip, etc.), or in any other suitable manner. In some implementations, rather than storing the enrollment data itself in the enrollment object, information is integrated in the enrollment object 105 to direct access to the enrollment data. For example, printed codes, embedded storage, etc. can be used to store a uniform resource locator (URL) string to a network address where the enrollment data is stored, etc. Whether the enrollment data itself, or access information to the enrollment data, is integrated with the enrollment object 105, such data can be obfuscated, encrypted, and/or otherwise protected in any suitable manner. In one embodiment, the enrollment data is encrypted using asymmetric encryption, such that anyone with a POA system 210 can use a public key to authenticate the object according to its enrollment data, but only users with a private key can generate and/or modify the enrollment data.

Subsequently, a POA system 210 can act as an authentication system to authenticate the object (now acting as an authentication object 155 and purported to be the enrollment object 105) by acquiring images of the authentication object 155 using an image acquisition system 120b, aligning the images into an image stack using an image stack generator 130b (e.g., which can be stored in an authentication data store 125b), and computing basis functions and extracting authentication magnitudes using a latent structural analyzer 140b (e.g., which can be stored in an authentication magnitudes store 145b). Embodiments of the POA system 210 can include, or be in communication with (e.g., via one or more networks), an authentication subsystem 150. As described above, the authentication subsystem 150 can obtain the authentication magnitudes (e.g., from the authentication magnitudes data store 145b and obtain the enrollment magnitudes (e.g., from the enrollment magnitudes data store 145a integrated with the authentication object 155), from which it can compute a mathematical correspondence (e.g., a fit score) and can determine whether to authenticate the authentication object 155.

The authentication subsystem 150 can obtain the enrollment data for authentication of the authentication object 155 in any suitable manner. In some embodiments, the authentication subsystem 150 is in communication with an enrollment data reader 510. The enrollment data reader 510 can include any suitable components for reading enrollment data (e.g., or data directing access to enrollment data) from the authentication object 155), such as a barcode scanner, an RFID reader, a magnetic ink reader, etc. In some implementations, the enrollment data reader 510 is implemented by the image acquisition system 120b. For example, the image acquisition system 120b can include a camera, which can acquire an image of a QR code that encodes the enrollment data, and the image acquisition system 120b can have software and/or hardware for decoding the QR code to obtain the enrollment data. Some implementations include further components for decrypting the obtained enrollment data, for accessing the enrollment data from a remote source according to the obtained data, etc. While the enrollment data is shown as obtained at the authentication subsystem 150 (via the enrollment data reader 510), the enrollment data can be obtained by other components of the POA system 210 in other implementations. For example, in some implementations, the stored enrollment data includes the aligned enrollment image stack (i.e., not the enrollment magnitudes). In such implementations, the enrollment data reader 510 can be in communication with the latent structural analyzer 140b, which can generate the enrollment magnitudes.

The embodiments shown in FIGS. 1-5 are intended only for illustration, and many other embodiments are possible for exploiting the novel techniques described herein. For example, techniques for embedding enrollment data in enrolled objects, and exploiting such embedded enrollment data, as described in FIG. 5, can be combined with various embodiments described with reference to FIGS. 1-4.

Figure 6:
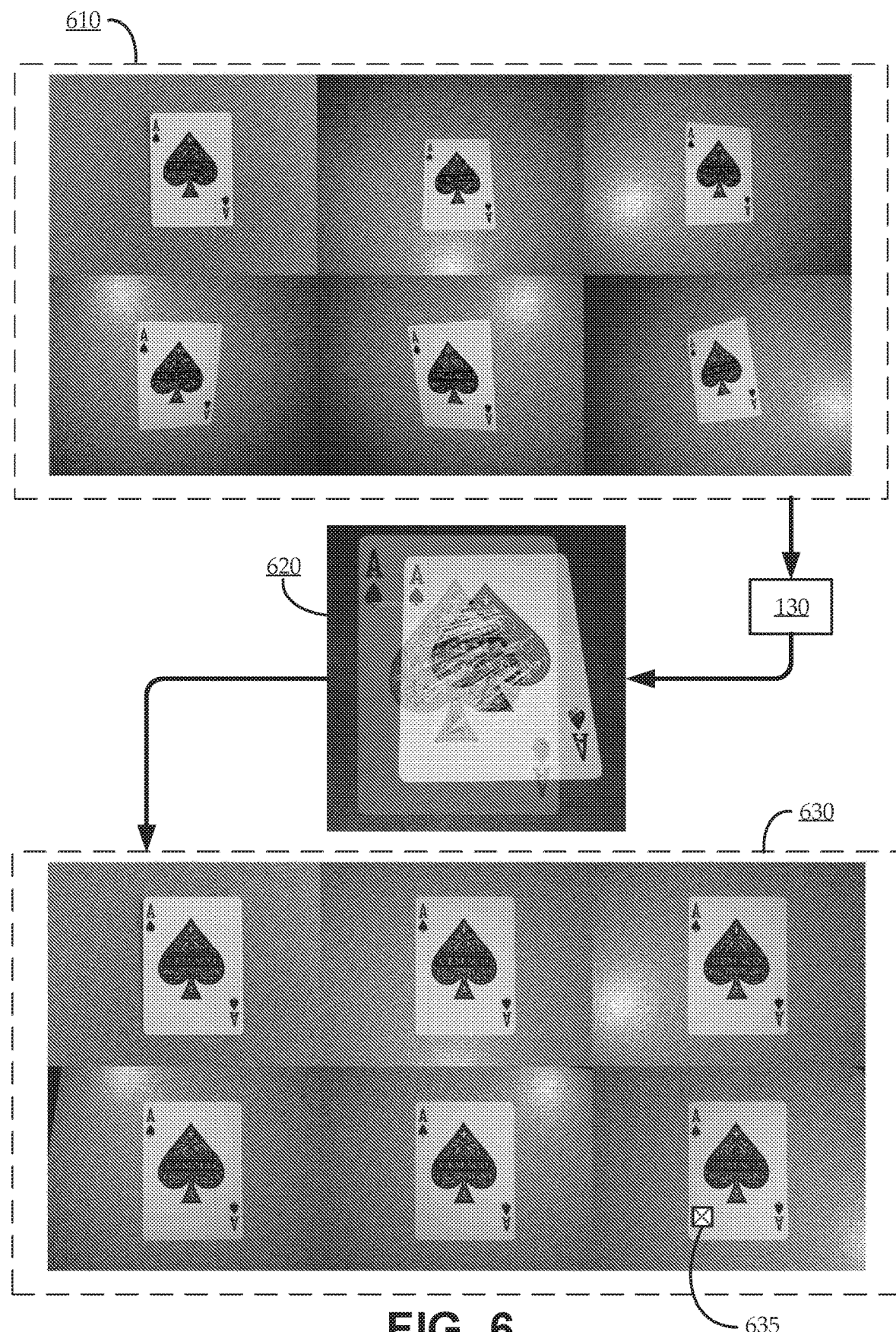
FIG. 6 shows acquisition and alignment of images in support of authenticating a standard playing card (COLOR)

For added clarity, FIGS. 6-8 show an illustrative example of authenticating an object according to techniques described herein. FIG. 6 shows acquisition and alignment of images in support of authenticating a standard playing card. A raw image set 610 can be acquired (e.g., six images are illustrated) from different optical geometries. An image stack generator 130 can use SURF or other techniques (e.g., illustrated as alignment process 620) to identify common features for use in aligning the images into an image stack. For example, the images can all be aligned to an image reference framework defined by one of the images (e.g., the top-left image). The aligned images are illustrated as image set 630. For the sake of illustration, a region 635 can be selected (e.g., randomly or according to some predetermined parameters) for use in characterizing latent structure of the playing card. As shown, the selected region is blank and of a predetermined size (e.g., a number of pixels, such as roughly 100,000 pixels at a resolution of 400 pixels per inch).

Figure 7A:
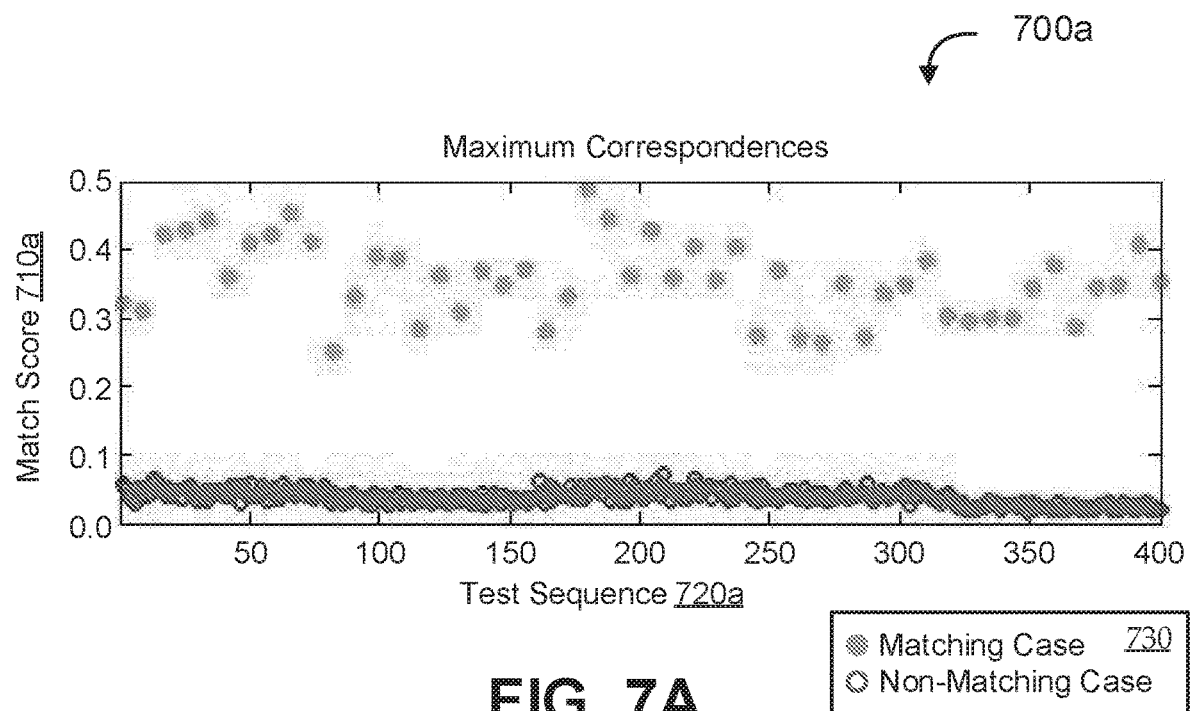
FIGS. 7A and 7B show illustrative experimental results from authenticating the playing card shown in FIG. 6 against itself (i.e., a "match") and against other apparently identical playing cards (i.e., a "no match") (COLOR)
Figure 7B:
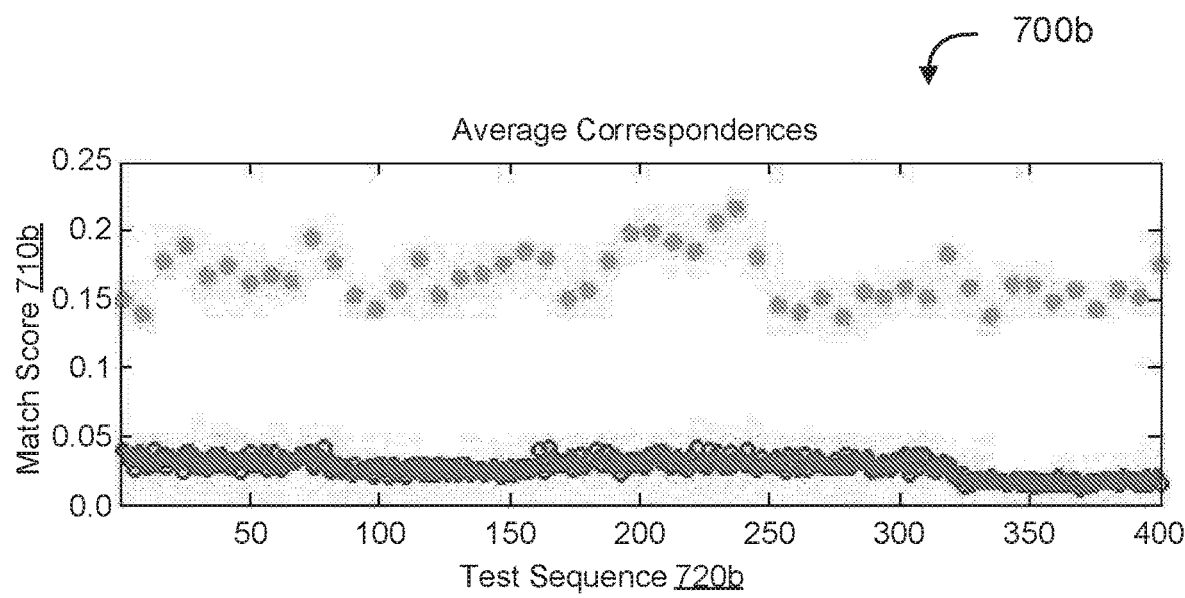

FIGS. 7A and 7B show illustrative experimental results from authenticating the playing card shown in FIG. 6 against itself (i.e., a "match") and against other apparently identical playing cards (i.e., a "no match"). The results are based on transforming the six images in the stack of FIG. 6 into four eigenimages (by eigenanalysis), and extracting four corresponding eigenvectors from those eigenimages over multiple, randomly selected regions (e.g., region 635 of FIG. 6). Those eigenvectors are treated as enrollment data. A set of images is subsequently acquired from each of five seemingly identical playing cards, yielding five sets of raw pixel data (each corresponding to a set of images acquired from each playing card taken from different optical geometries). A mathematical correspondence is computed by applying a least squares fit between the extracted eigenvectors of the enrollment playing card and a linear combination of pixel values from the image stack of each purported matching playing card. FIGS. 7A and 7B show graphs 700 of maximum correlation coefficient (match score 710a) and average correlation coefficient (match score 710b), respectively, for the comparisons over a large number of attempts (indicated as test sequence 720). As shown, while the correlation coefficients are not very large, there is a large separation between the "match" cases and the "no match" cases (i.e., the legend 730 identifies the match and no match data). For example, even in a match case (i.e., the authentication object is the enrollment object), differences in the optical geometries used to acquire images for each image stack can reduce the match score (e.g., even with the same latent structure, the differences in optical geometries can cause a rotation of the eigenvectors or other effect). Still, as shown, the match cases tend to produce maximum correlation coefficients of between about 0.3 and 0.5, and average correlation coefficients of between about 0.15 and 0.2; while even the maximum correlation coefficients in the no match cases are well below 0.1. Accordingly, a threshold match score can be determined that clearly separates authentic match conditions from no match conditions.

Figure 8A:
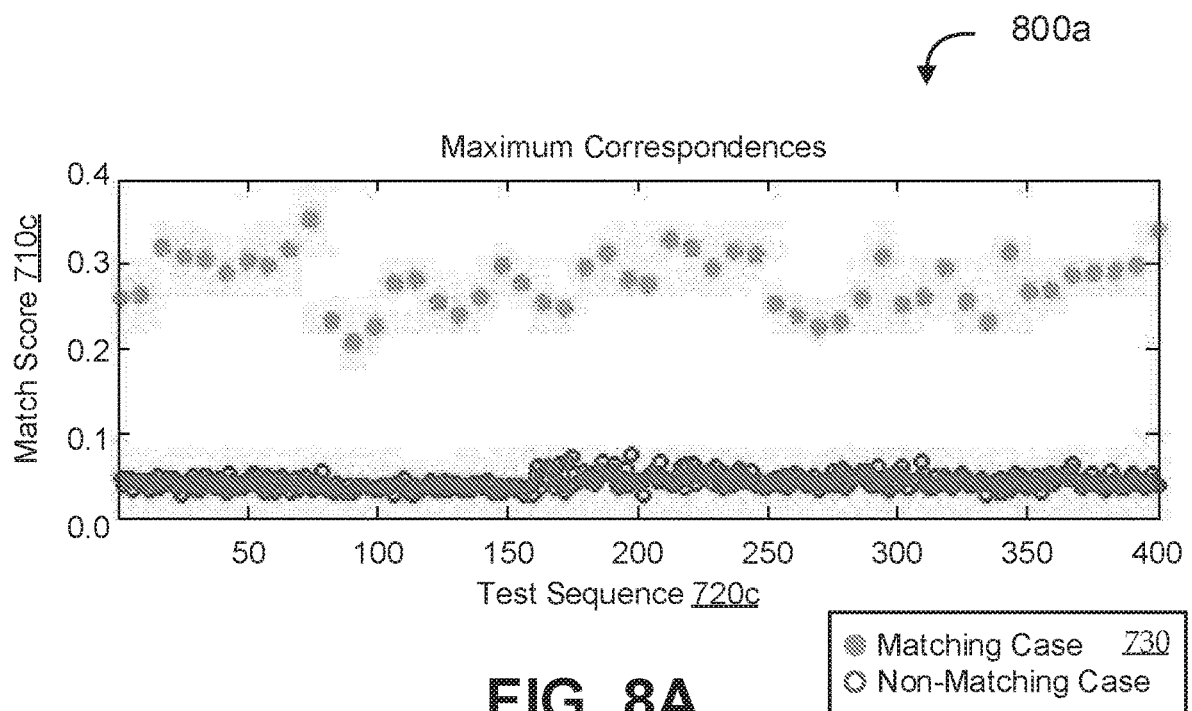
FIGS. 8A and 8B show illustrative experimental results from authenticating the playing card shown in FIG. 6 against itself and against other apparently identical playing cards without using latent variable analysis (COLOR)
Figure 8B:
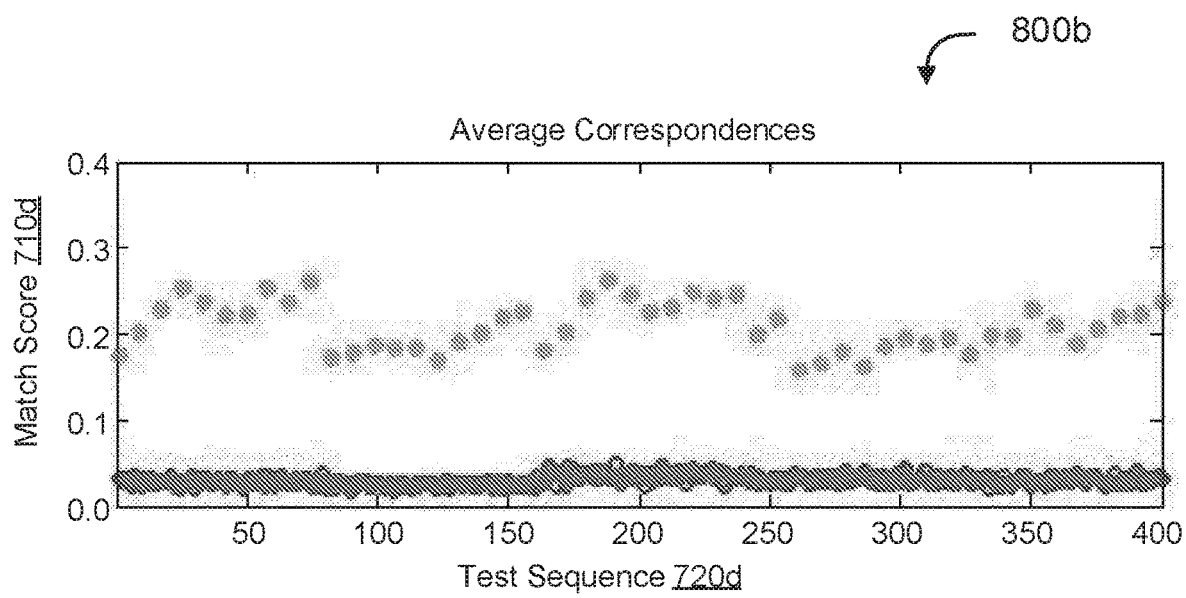

FIGS. 8A and 8B show illustrative experimental results from authenticating the playing card shown in FIG. 6 against itself (i.e., a "match") and against other apparently identical playing cards (i.e., a "no match") without using latent variable analysis. The results extract magnitudes from raw pixel data of the six images in the stack of FIG. 6 over multiple, randomly selected regions (e.g., region 635 of FIG. 6). The raw pixel data is treated as enrollment data. A set of images is subsequently acquired from each of five seemingly identical playing cards, yielding five sets of raw pixel data (each corresponding to a set of images acquired from each playing card taken from different optical geometries). A mathematical correspondence is computed by applying a least squares fit between the extracted magnitudes of the enrollment playing card and a linear combination of pixel values from the image stack of each purported matching playing card (i.e., the analysis directly compares linear sums of pixel values without using latent variable analysis). FIGS. 8A and 8B show graphs 800 of maximum correlation coefficient (match score 710c) and average correlation coefficient (match score 710d), respectively, for the comparisons over a large number of attempts (indicated as test sequence 720). As in FIGS. 7A and 7B, while the correlation coefficients are not very large, there remains a large separation between the "match" cases and the "no match" cases, and a threshold match score can be determined to clearly separate authentic matches from no match conditions.

Figure 9:
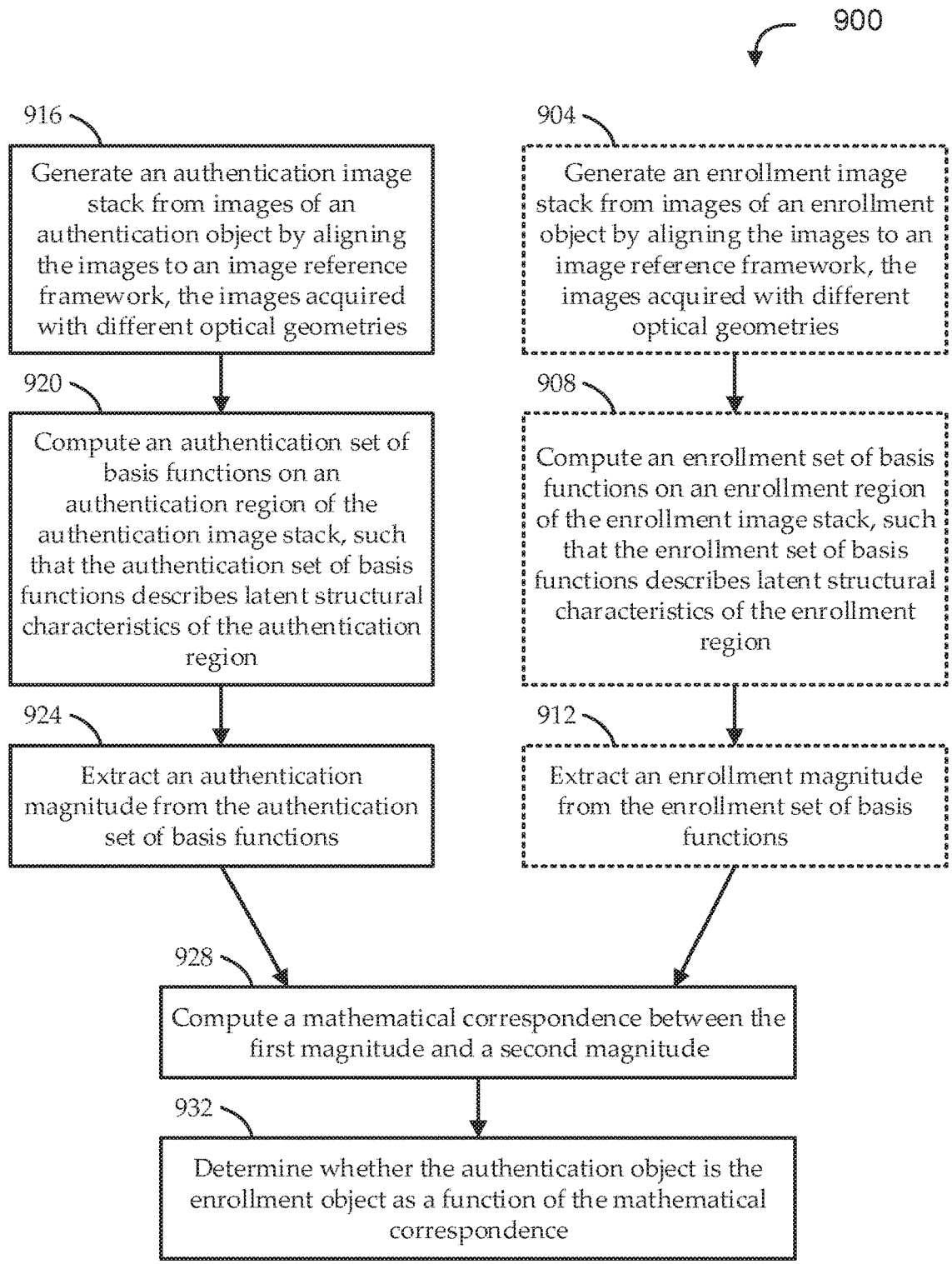
FIG. 9 shows a flow diagram of an illustrative method for object authentication by optical latent structural analysis, according to various embodiments.

FIG. 9 shows a flow diagram of an illustrative method 900 for object authentication by optical latent structural analysis, according to various embodiments. Some embodiments of the method 900 begin by characterizing latent structural characteristics of an enrollment object at stages 904-912. For example, at stage 904, embodiments can generate an enrollment image stack from images of an enrollment object by aligning the images to an image reference framework, the images acquired with different optical geometries. At stage 908, an enrollment set of basis functions can be computed on an enrollment region of the enrollment image stack, such that the enrollment set of basis functions describes latent structural characteristics of the enrollment region. At stage 912, an enrollment magnitude (e.g., a set of magnitudes) can be extracted from the enrollment set of basis functions.

Other embodiments of the method can begin (or continue) to authenticate an object against a previously enrolled object at stages 916-924. For example, at stage 916, embodiments can generate an authentication image stack from images of an authentication object by aligning the images to an image reference framework (the same reference framework used in enrollment; a different reference framework derived from one of the images of the authentication image stack; etc.), the images acquired with different optical geometries (e.g., the same or different from those used during enrollment). At stage 920, an authentication set of basis functions can be computed on an authentication region of the authentication image stack, such that the authentication set of basis functions describes latent structural characteristics of the authentication region. At stage 924, an authentication magnitude (e.g., a set of magnitudes) can be extracted from the authentication set of basis functions. At stage 928, embodiments can compute a mathematical correspondence between the enrollment magnitude and the authentication magnitude. At stage 932, a determination can be made as to whether the authentication object is the enrollment object as a function of the mathematical correspondence.

As described above, various stages of the enrollment and authentication processes can occur in any suitable sequence (i.e., in series, parallel, etc.). For example, some implementations store the set of enrollment images and/or the enrollment image stack (e.g., after registration at stage 904) without performing further processing at that time. In such implementations, stages 908-932 can all be performed during the authentication stage. In other implementations, all of stages 904-912 are performed during enrollment, and only stages 916-932 are performed during authentication.

The method of FIG. 9 can be implemented using any of the systems described above and/or other system implementations; and the systems described above can implement methods other than those described with reference to FIG. 9. Some of the functions of the methods and systems described herein can be implemented in one or more computational environments.

Figure 10:
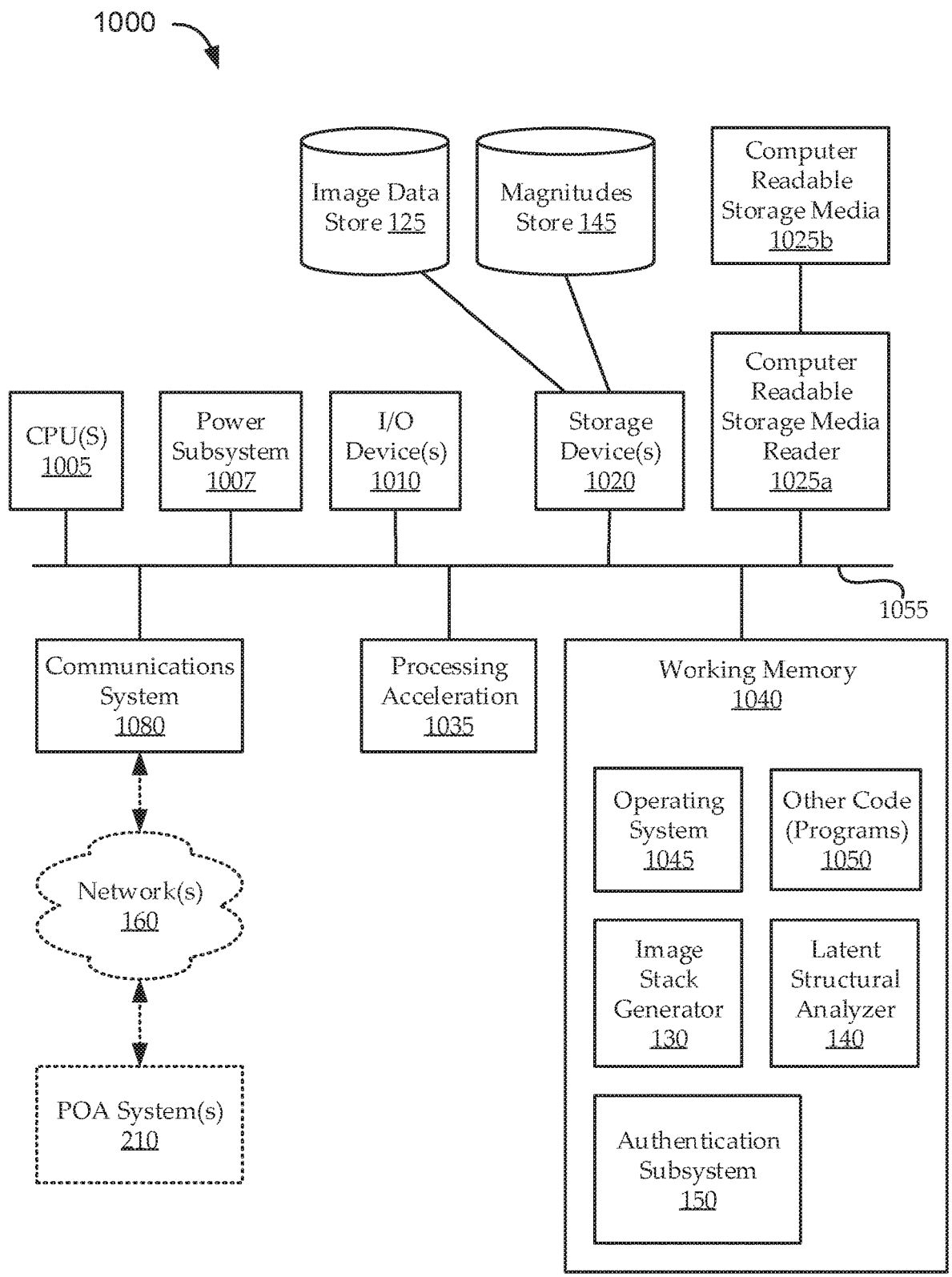
FIG. 10 shows an exemplary computational environment for implementing optical security features formed by quasi-random optical characteristics of credential substrates, according to various embodiments.

FIG. 10 shows an exemplary computational environment 1000 for implementing object authentication by optical latent structural analysis, according to various embodiments. For example, the computational environment 1000 can be an implementation of some or all of an enrollment/authentication system 110. The computational environment 1000 can be implemented as or embodied in single or distributed computer systems, or in any other useful way. The computational environment 1000 is shown including hardware elements that may be electrically coupled via a bus 1055.

The hardware elements may include one or more central processing units (CPUs) and/or other processor(s) 1005. Implementations can also include one or more input/output devices 1010. For example, the input/output devices 1010 can include, and/or be in communication with an image acquisition system, one or more indicators, user interface devices, etc. Some implementations also include a power subsystem 1007, including any suitable power storage, power electronics, power interfaces, etc. Some implementations can permit data to be exchanged, via a communications subsystem 1080, with one or more networks (e.g., with one or more point-of-authentication systems 210, storage networks, etc. via one or more networks 160) and/or any other computer or external system. The communications subsystem 1080 can include a modem, a network card (wireless or wired), an infrared communication device, and/or any other suitable components or combinations thereof.

The computational environment 1000 can also include one or more storage devices 1020. By way of example, storage device(s) 1020 may be disk drives, optical storage devices, solid-state storage device such as a random access memory (RAM) and/or a read-only memory (ROM), which can be programmable, flash-updateable and/or the like. The computational environment 1000 can additionally include a computer-readable storage media reader 1025a, and working memory 1040, which may include RAM and ROM devices as described above. The computer-readable storage media reader 1025a can further be connected to a computer-readable storage medium 1025b, together (and, optionally, in combination with storage device(s) 1020) comprehensively representing remote, local, fixed, and/or removable storage devices plus storage media for temporarily and/or more permanently containing computer-readable information. The storage device(s) 1020, computer-readable storage media and media reader 1025, and/or working memory 1040 can be used to implement the image data store 125 and/or the magnitudes store 145.

In some embodiments, the computational environment 1000 can also include a processing acceleration unit 1035, which can include a DSP, a special-purpose processor and/or the like. The computational environment 1000 may also include software elements, shown as being currently located within a working memory 1040, including an operating system 1045 and/or other code 1050, such as an application program (which may be a client application, web browser, mid-tier application, etc.). For example, embodiments can be implemented as instructions, which, when executed by one or more processors 1005, cause the processors 1005 to perform certain functions. Such functions can include functionality of the image stack generator 130, the latent structural analyzer 140, and/or the authentication subsystem 150, for example, as described above.

A software module can be a single instruction, or many instructions, and can be distributed over several different code segments, among different programs, and across multiple storage media. Thus, a computer program product may perform operations presented herein. For example, such a computer program product may be a computer readable tangible medium having instructions tangibly stored (and/or encoded) thereon, the instructions being executable by one or more processors to perform the operations described herein. The computer program product may include packaging material. Software or instructions may also be transmitted over a transmission medium. For example, software may be transmitted from a website, server, or other remote source using a transmission medium such as a coaxial cable, fiber optic cable, twisted pair, digital subscriber line (DSL), or wireless technology such as infrared, radio, or microwave.

Alternate embodiments of a computational environment 1000 may have numerous variations from that described above. For example, customized hardware might also be used and/or particular elements might be implemented in hardware, software (including portable software, such as applets), or both. Further, connection to other computing devices such as network input/output devices may be employed. Software of the computational environment 1000 may include code 1050 for implementing embodiments as described herein. For example, while not shown as part of the working memory 1040, certain functionality of other subsystems can be implemented with any suitable combination of hardware and software, including using code 1050 stored in the working memory 1040.

Figure 11:
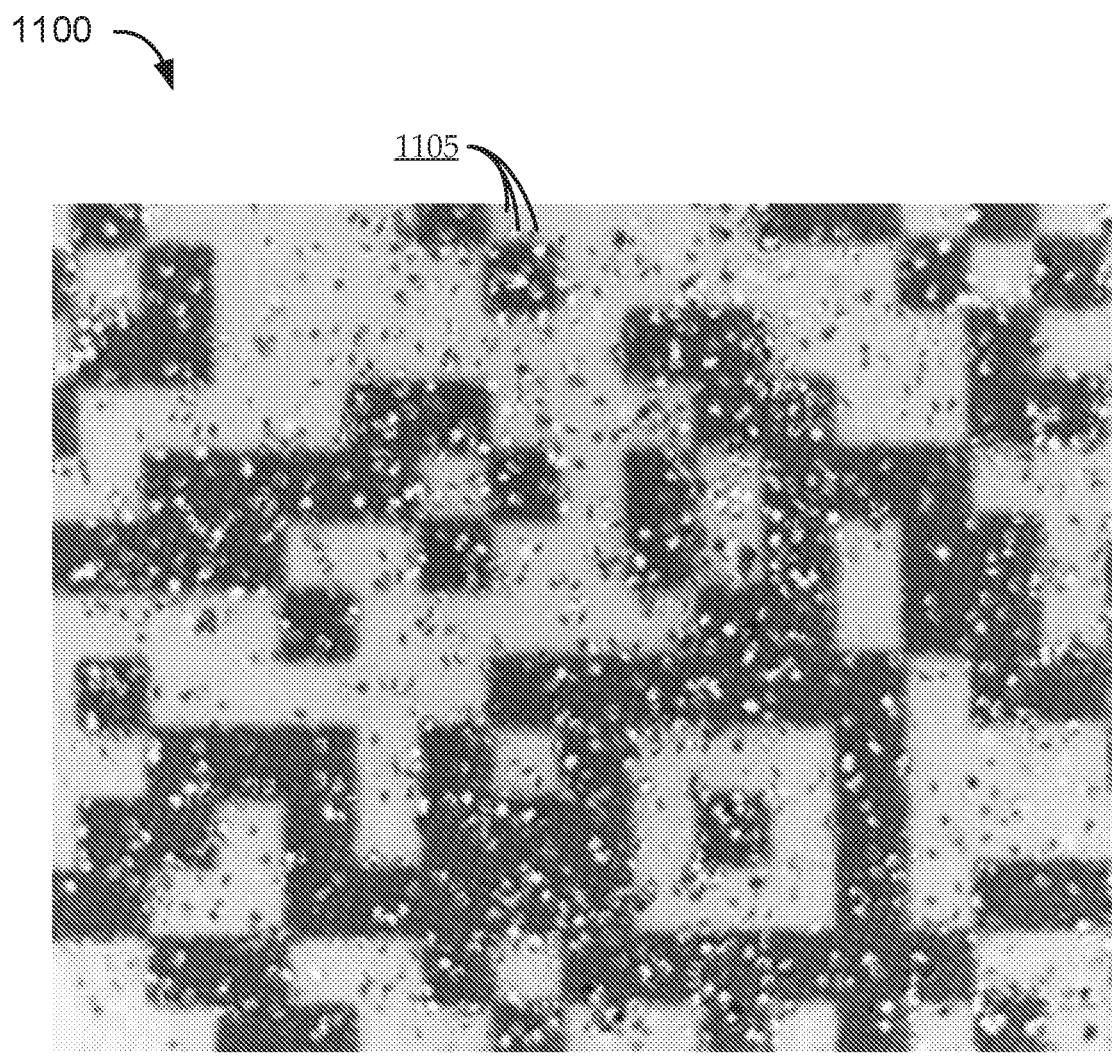
FIG. 11 shows a random distribution of metal flakes coating a portion of a QR barcode and uniformly illuminated from four azimuth directions (COLOR)

FIG. 11 shows another exemplary embodiment of a credential substrate region having a random distribution of metal flakes 1105 in a clear liquid binder that was brushed on to a Quick Response (QR) barcode 1100 and dried. Once the binder is fully cured, the metal flakes are adhered to the underlying image or other substrate. Depending on the nature of the binder, the adhesion of the particles to the substrate may be essentially permanent which can ensure that, if the random distribution of particles is authenticated by techniques disclosed herein, the substrate and any printing on it can also be considered as authenticated. As an example, the information contained in the QR barcode 1100 may be deemed authentic once the metal flake pattern adhered to it is determined to be authentic. As another example, a random distribution of metal flakes or other particles may be adhered to an image such as a facial image incorporated as part of a credential. In such an instance, once the facial image is authenticated by techniques described herein, the authenticated image can be compared to a facial image of the credential holder by either a human assessment or via some type of biometric matching software. In a similar way, other biometric features such as iris, periocular features, fingerprints, etc. may be used to determine the match between the authenticated image on the credential and the holder of the credential.

Figure 12A:
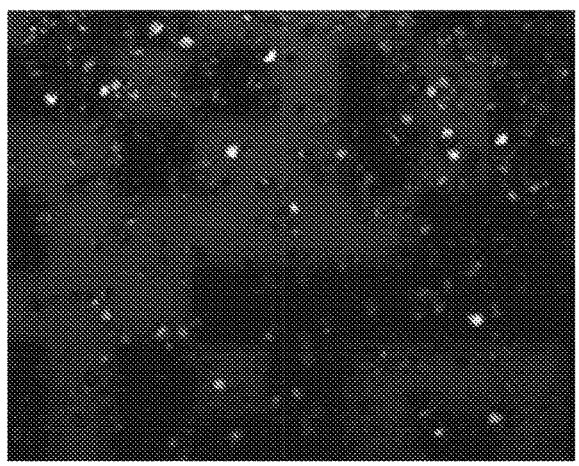
FIG. 12 shows four close-ups of a portion of the metal flakes and barcode of FIG. 11 taken from the same image position and four different illumination angles (COLOR).
Figure 12B:
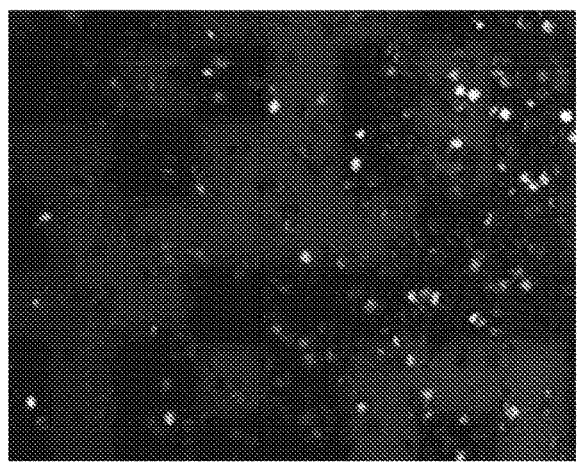
Figure 12C:
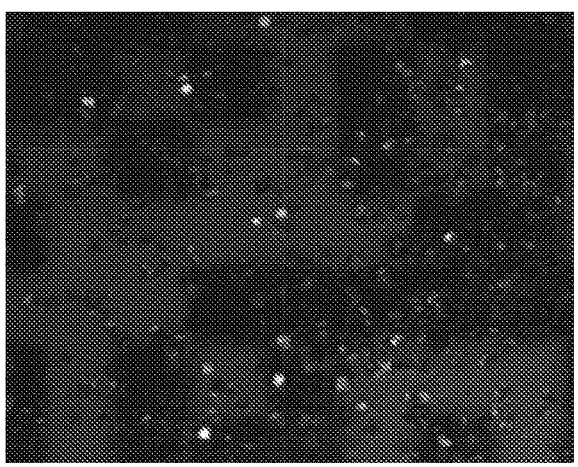
Figure 12D:
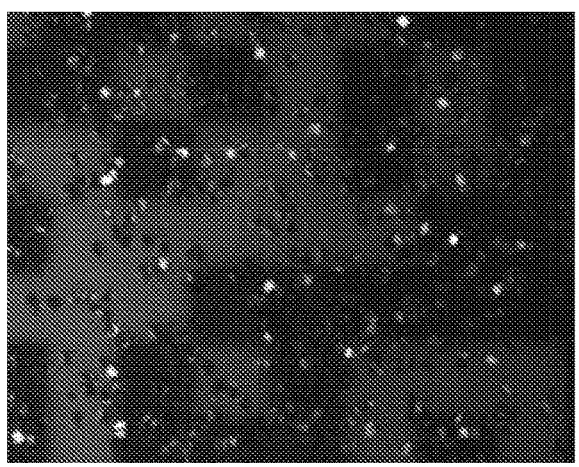

FIGS. 12A-12D show a close-up of a region (zone) 1200 of the metal flakes 1105 and QR barcode 1100 of FIG. 11 under four different illustrative illumination conditions, respectively. FIG. 12A shows the pattern that can result when illuminated from an azimuth angle of zero degrees. FIGS. 12B-12D show the patterns that can result when illuminating the same region at azimuth angles of 90, 180, and 270 degrees, respectively. All images are collected from a same (fixed) imaging position. Alternatively, similar images can be generated when collected from different image angles and then registered subsequently according to techniques described herein. In either case, images of particles, such as metal flakes, can be expected to change substantially based on the interaction between the particle position and orientation, the illumination geometry, and the imaging geometry. This complex interaction and the resulting set of images can be used, as described herein, to determine authenticity of the particle distribution as well as any other material and/or printed information to which the particles are adhered.

A variety of particles other than metal flakes can be used with techniques described herein. Such particles may be specular reflectors, diffuse reflectors, or some combination thereof. Alternatively the particles can comprise an optical thin-film, optical grating, optically variable pigments, holographic flakes, and/or other means by which incident light can constructively and destructively interfere in various ways. Further, the particles may uniformly reflect all wavelengths of light or may preferentially reflect certain wavelengths and/or suppress other wavelengths. In some embodiments, the particles may be brushed onto a substrate, sprayed onto a substrate, or otherwise coat some or all of the substrate in a random or pseudo-random manner. Alternatively, the particles may be embedded in a clear or colored film that is adhered to a substrate layer. In these embodiments, the particles are forming a forge-proof zone covering data to be secured on the document. The particles cannot be removed and the data cannot be accessed, modified or forged without disturbing the distribution of the particles. Therefore, by verifying the authenticity of the distribution of said particles in said zone, one can ensure the authenticity of said the data and by consequence of the document.

In some embodiments, secure data can be printed, engraved, or embedded (in or on) a layer comprising the particles, or even on the particles themselves. An example of this can be metal flakes suspended in a surface coating, which is applied to a document substrate. The flakes can be small, aluminium flakes of about 100 nanometers each, suspended in a polymer matrix (e.g., PET or polycarbonate adhesive), or any other resin, gelatin, etc. The suspension can easily be applied on the surface of the document by silk screen techniques, gravure coating, slot coating, and/or any other known coating techniques in the art. This can facilitate creating, for example, a small metallic patch on the document, on which data (e.g., a picture of the credential holder's face) can be applied by laser engraving, or the like. Even if the density of metal flakes is uniform and homogeneous over the entire surface of the patch, the distribution of the metal flakes on a microscopic level in term of variations of their sizes and orientations likely manifests unique, latent structural characteristics, which can be identified, verified, and authenticated by the techniques described herein. In a similar manner, if the substrate is be made of paper, then the latent structural characteristics can correspond to the distribution of the pulp fibers of the zone of the paper substrate on which the secure data are printed.

The methods disclosed herein include one or more actions for achieving the described method. The method and/or actions may be interchanged with one another without departing from the scope of the claims. In other words, unless a specific order of actions is specified, the order and/or use of specific actions may be modified without departing from the scope of the claims.

Other examples and implementations are within the scope and spirit of the disclosure and appended claims. For example, features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C). Further, the term "exemplary" does not mean that the described example is preferred or better than other examples.

Various changes, substitutions, and alterations to the techniques described herein can be made without departing from the technology of the teachings as defined by the appended claims. Moreover, the scope of the disclosure and claims is not limited to the particular aspects of the process, machine, manufacture, composition of matter, means, methods, and actions described above. Processes, machines, manufacture, compositions of matter, means, methods, or actions, presently existing or later to be developed, that perform substantially the same function or achieve substantially the same result as the corresponding aspects described herein may be utilized. Accordingly, the appended claims include within their scope such processes, machines, manufacture, compositions of matter, means, methods, or actions.

What is claimed is:

1. A method to verify the authenticity of an object, the method comprising:
generating a first image stack from a first plurality of images of an authentication object by aligning the first plurality of images to an image reference framework so that a particular spatial location in one of the images of the first image stack corresponds to a comparable spatial location in remaining images of the first image stack, the first plurality of images acquired with different optical geometries;
computing a first set of basis functions for a first region of the first image stack, the first region of the first image stack comprising a comparable region from each of the first plurality of images, and the first set of basis functions describing latent structural characteristics of the first region;
extracting at least one first magnitude from the first set of basis functions;
computing a mathematical correspondence between the at least one first magnitude and at least one second magnitude, the at least one second magnitude extracted from a second set of basis functions for a second region of a second image stack generated from a previously acquired second plurality of images of an enrollment object, the second region of the second image stack comprising a comparable region from each of the second plurality of images, wherein computing the mathematical correspondence comprises at least one of correlating the at least one first magnitude against a linear or non-linear combination of a plurality of second magnitudes or correlating the at least one second magnitude against a linear or non-linear combination of a plurality of first magnitudes, to obtain at least one correlation coefficient; and
determining whether the authentication object is the enrollment object as a function of the at least one coefficient.

2. The method of claim 1, wherein:
each optical geometry is defined by a geometric relationship between the authentication object, an image sensor, and an illumination source; and
each image in the first plurality of images is acquired with a respective different optical geometry by repositioning at least one of the image sensor or the illumination source relative to the authentication object in a non-predetermined manner.

3. The method of claim 1, wherein the image reference framework is derived from one of the first plurality of images.

4. The method of claim 1, wherein the first and second sets of basis functions are computed by latent variable analysis.

5. The method of claim 1, wherein:
extracting the at least one first magnitude comprises deriving a plurality of images from the first image stack, wherein the plurality of images is one of a plurality of Eigen-space images or a plurality of pixel-space images;
the at least one second magnitude is extracted by deriving a linear combination of images from the second image stack, wherein the linear combination of images is one of a linear combination of Eigen-space images or a linear combination of pixel-space images; and computing the mathematical correspondence comprises computing a plurality of correlations, each correlation being between one of the plurality of images derived from the first image stack images and the linear combination of images derived from the second image stack.

6. The method of claim 1, wherein:
extracting the at least one first magnitude comprises deriving a linear combination of images from the first image stack, wherein the linear combination of images is one of a linear combination of Eigen-space images or a linear combination of pixel-space images;
the at least one second magnitude is extracted by deriving a plurality of images from the second image stack, wherein the plurality of images is one of a plurality of Eigen-space images or a plurality of pixel-space images; and
computing the mathematical correspondence comprises computing a plurality of correlations, each correlation being between one of the plurality of images derived from the second image stack images and the linear combination of images derived from the first image stack.

7. The method of claim 1, further comprising:
acquiring the second plurality of images of the enrollment object prior to generating the first image stack; and
generating the second image stack by aligning the second plurality of images to a second image reference framework so that a particular spatial location in one of the images of the second image stack corresponds to a comparable spatial location in remaining images of the second image stack, wherein the second image reference framework is derived from one of the second plurality of images.

8. The method of claim 1, wherein determining whether the authentication object is the enrollment object comprises one of: verifying an authenticity of the authentication object according to the enrollment object; or identifying the authentication object according to the enrollment object, wherein the enrollment object is one of a plurality of enrollment objects.

9. The method of claim 1, wherein:
the authentication object is a document comprising a layer of stochastically distributed elements; and
determining whether the authentication object is the enrollment object comprises verifying the distribution of the elements in at least one zone of the layer according to an enrolled distribution of the enrollment object.

10. The method of claim 9, wherein said stochastically distributed elements are selected from the group consisting of: fibers, granules, flakes, diffuse reflectors, specular deflectors, optical gratings, optically variable pigments, and a combination thereof.

11. The method of claim 9, wherein the at least one zone is positioned in association with secure data of the document, such that modification of the secure data disturbs at least a portion of the distribution of the elements in the zone, and such that the secure data is verifiable by verifying the distribution of the elements in the zone.

12. The method of claim 11, wherein the secure data is printed, engraved, or embedded in or on the layer in a position that at least partially overlaps with the zone.

13. The method of claim 11, wherein the layer comprising the stochastically distributed elements is applied on the document such that the zone at least partially covers the secure data.

14. An object authentication system, comprising:
an image acquisition device operable to acquire a first plurality of images with a plurality of optical geometries relative to an authentication object;
an image stack generator operable to align the first plurality of images to an image reference framework so that a particular spatial location in one of the first plurality of images corresponds to a comparable spatial location in remaining images of the first plurality of images to generate a first image stack;
a latent structural analyzer operable to:
compute a first set of basis functions for a first region of the first image stack, the first region of the first image stack comprising a comparable region from each of the first plurality of images, and the first set of basis functions describing the latent structural characteristics of the first region; and
extract at least one first magnitude from the first set of basis functions; and
an authentication subsystem operable to:
compute a mathematical correspondence between the at least one first magnitude and at least one second magnitude, the at least one second magnitude extracted from a second set of basis functions for a second region of a second image stack generated from a previously acquired second plurality of images of an enrollment object, the second region of the second image stack comprising a comparable region from each of the second plurality of images, wherein computing the mathematical correspondence comprises at least one of correlating the at least one first magnitude against a linear or non-linear combination of a plurality of second magnitudes or correlating the at least one second magnitude against a linear or non-linear combination of a plurality of first magnitudes, to obtain at least one correlation coefficient; and
determine whether the authentication object is the enrollment object as a function of the at least one coefficient.

15. The object authentication system of claim 14, further comprising:
an enrollment subsystem operable to:
acquire the second plurality of images of the enrollment object with a plurality of optical geometries relative to the enrollment object;
generate the second image stack;
compute the second set of basis functions; and
extract the at least one second magnitude from the second set of basis functions.

* * * * *